US011853923B2

(12) United States Patent
Crutcher et al.

(10) Patent No.: US 11,853,923 B2
(45) Date of Patent: Dec. 26, 2023

(54) METHOD FOR CONTROLLING REMOTE SYSTEM SETTINGS USING CLOUD-BASED CONTROL PLATFORM

(71) Applicant: Vigilante Strategy LLC, Frisco, TX (US)

(72) Inventors: Mark Crutcher, Frisco, TX (US); Daniel Shanklin, Frisco, TX (US); Michael Fischman, Frisco, TX (US)

(73) Assignee: Vigilante Strategy LLC, Frisco, TX (US)

( * ) Notice: Subject to any disclaimer, the term of this patent is extended or adjusted under 35 U.S.C. 154(b) by 26 days.

(21) Appl. No.: 17/511,273

(22) Filed: Oct. 26, 2021

(65) Prior Publication Data

US 2022/0051275 A1 Feb. 17, 2022

Related U.S. Application Data

(63) Continuation-in-part of application No. 16/986,358, filed on Aug. 6, 2020, now abandoned.

(51) Int. Cl.
  *G06Q 30/0201* (2023.01)
  *G06F 16/25* (2019.01)
  *G06F 16/23* (2019.01)

(52) U.S. Cl.
  CPC ..... *G06Q 30/0206* (2013.01); *G06F 16/2358* (2019.01); *G06F 16/2379* (2019.01); *G06F 16/256* (2019.01)

(58) Field of Classification Search
  CPC ............ G06Q 30/0206; G06F 16/2379; G06F 16/256; G06F 16/2358

(Continued)

(56) References Cited

U.S. PATENT DOCUMENTS 7,647,269 B2   1/2010 Brett
7,747,507 B2   6/2010 Brett
(Continued)

FOREIGN PATENT DOCUMENTS

CA   2846342 A1 * 9/2014 ............ G05B 15/02
CN   211429596 U  * 9/2020

OTHER PUBLICATIONS

Vanouni, Maziar, et al, "Improving the Centralized Control of Thermostatically Controlled Appliances by Obtaining the Right Information," Sep. 23, 2014, IEEE Transactions on Smart Grid, vol. 6, No. 2, (Year: 2014).*

(Continued)

*Primary Examiner* — Marissa Thein
*Assistant Examiner* — Thomas Joseph Sullivan
(74) *Attorney, Agent, or Firm* — Henry Patent Law Firm PLLC

(57) ABSTRACT

In a general aspect, a cloud-based control platform remotely controls variable settings on a remotely-controlled system. In some aspects, the platform maintains a database of data objects for assets, and the data objects include static and dynamic hyperparameters associated with the asset and a template that specifies values of a variable associated with the asset for future time points. The platform updates a template for a data object by calculating target values for the variable for the future time points based on a target criterion, communicating with remote computer systems to determine current values of the dynamic hyperparameters, calculating scaled values for the future time points by applying a determined ratio to the target values, adjusting the scaled values based on the static hyperparameters, applying an override value to the adjusted scaled values. The remotely-controlled system is updated according to the updated template at each of the future time points.

4 Claims, 13 Drawing Sheets

(58) Field of Classification Search
USPC .......................................................... 705/27.1
See application file for complete search history.

(56) References Cited

U.S. PATENT DOCUMENTS

| | | | |
|---|---|---|---|
| 7,792,700 | B2 | 9/2010 | Dubin et al. |
| 7,917,398 | B2 | 3/2011 | Gibson et al. |
| 8,024,234 | B1 | 9/2011 | Thomas et al. |
| 8,032,442 | B2 | 10/2011 | Fluhr et al. |
| 8,126,748 | B2 | 2/2012 | Sunshine et al. |
| 8,190,586 | B2 | 5/2012 | Knuetter et al. |
| 8,204,796 | B2 | 6/2012 | Dubin et al. |
| 8,209,241 | B2 | 6/2012 | Gibson et al. |
| 8,326,696 | B2 | 12/2012 | Goldstein et al. |
| 8,386,334 | B2 | 2/2013 | Thomas et al. |
| 8,397,984 | B1 | 3/2013 | Bascombe |
| 8,463,630 | B2 | 6/2013 | Hirose et al. |
| 8,521,618 | B2 | 8/2013 | Gibson et al. |
| 8,538,856 | B2 | 9/2013 | Brett |
| 8,577,743 | B2 | 11/2013 | Dubin et al. |
| 8,606,644 | B1 | 12/2013 | Bruckhaus et al. |
| 8,608,054 | B2 | 12/2013 | Bascombe |
| 8,639,541 | B2 | 1/2014 | Sunshine et al. |
| 8,661,025 | B2 | 2/2014 | Gibson et al. |
| 8,666,829 | B1 | 3/2014 | Bruckhaus |
| 8,668,568 | B2 | 3/2014 | Denker et al. |
| 8,671,001 | B1 | 3/2014 | Thompson et al. |
| 8,700,540 | B1 | 4/2014 | Zambrano et al. |
| 8,731,526 | B2 | 5/2014 | Gibson et al. |
| 8,732,007 | B2 | 5/2014 | Gibson et al. |
| 8,732,033 | B2 | 5/2014 | Brett |
| 8,738,409 | B2 | 5/2014 | Fineman et al. |
| 8,756,178 | B1 | 6/2014 | Bruckhaus et al. |
| 8,812,525 | B1 | 8/2014 | Taylor |
| 8,833,642 | B2 | 9/2014 | Bascombe |
| 8,844,031 | B1 | 9/2014 | Bruckhaus |
| 8,870,089 | B2 | 10/2014 | Gibson et al. |
| 8,890,872 | B1 | 11/2014 | Towfiq et al. |
| 9,064,212 | B2 | 6/2015 | Bruckhaus et al. |
| 9,171,269 | B2 | 10/2015 | Bascombe |
| 9,230,288 | B2 | 1/2016 | Elias et al. |
| 9,310,205 | B2 | 4/2016 | Xu et al. |
| 9,367,848 | B2 | 6/2016 | Salles |
| 9,390,401 | B2 | 7/2016 | Engle |
| 9,398,410 | B2 | 7/2016 | Cao |
| 9,530,108 | B2 | 12/2016 | Thomas et al. |
| 9,552,592 | B2 | 1/2017 | Gibson et al. |
| 9,563,859 | B2 | 2/2017 | Bascombe |
| 9,836,706 | B2 | 12/2017 | Towfiq et al. |
| 9,978,096 | B2 | 5/2018 | Gibson et al. |
| 10,055,696 | B2 | 8/2018 | Engle |
| 10,177,930 | B1* | 1/2019 | Bodkin ............... G05B 13/026 |
| 10,192,174 | B2 | 1/2019 | Sunshine et al. |
| 10,217,065 | B2 | 2/2019 | Nestor et al. |
| 10,366,373 | B1 | 7/2019 | Denker et al. |
| 10,387,806 | B2 | 8/2019 | Towfiq et al. |
| 10,423,894 | B2 | 9/2019 | Sunshine et al. |
| 10,423,895 | B2 | 9/2019 | Sunshine et al. |
| 10,453,001 | B2 | 10/2019 | Sunshine et al. |
| 10,528,894 | B2 | 1/2020 | Sunshine et al. |
| 10,592,826 | B2 | 3/2020 | Akpala |
| 10,614,384 | B2 | 4/2020 | Ngo et al. |
| 11,365,898 | B1* | 6/2022 | Smith ..................... F24F 11/38 |
| 2007/0055554 | A1 | 3/2007 | Sussman et al. |
| 2008/0103934 | A1 | 5/2008 | Gibson et al. |
| 2008/0162211 | A1 | 7/2008 | Addington |
| 2008/0195580 | A1 | 8/2008 | Knuetter et al. |
| 2008/0235110 | A1 | 9/2008 | Carter et al. |
| 2008/0255889 | A1 | 10/2008 | Geisler et al. |
| 2009/0216571 | A1 | 8/2009 | Sunshine et al. |
| 2010/0113072 | A1 | 5/2010 | Gibson et al. |
| 2010/0131366 | A1 | 5/2010 | Gibson et al. |
| 2010/0131530 | A1 | 5/2010 | Gibson et al. |
| 2010/0133339 | A1 | 6/2010 | Gibson et al. |
| 2010/0138291 | A1* | 6/2010 | Silverman ......... G06Q 30/0275 |
| | | | 705/14.46 |
| 2010/0169130 | A1 | 7/2010 | Fineman et al. |
| 2011/0099092 | A1 | 4/2011 | Gibson et al. |
| 2011/0166950 | A1 | 7/2011 | Goldstein et al. |
| 2011/0208418 | A1 | 8/2011 | Looney et al. |
| 2011/0218878 | A1 | 9/2011 | Dubin et al. |
| 2011/0307112 | A1* | 12/2011 | Barrilleaux .......... H05B 47/105 |
| | | | 700/291 |
| 2011/0320227 | A1 | 12/2011 | Thomas et al. |
| 2012/0016718 | A1 | 1/2012 | Kahn et al. |
| 2012/0054070 | A1 | 3/2012 | Fluhr et al. |
| 2012/0123813 | A1 | 5/2012 | Sunshine et al. |
| 2012/0166230 | A1 | 6/2012 | Ngo et al. |
| 2012/0166960 | A1 | 6/2012 | Salles |
| 2012/0209662 | A1 | 8/2012 | Kahn et al. |
| 2012/0259733 | A1 | 10/2012 | Dubin et al. |
| 2012/0265652 | A1 | 10/2012 | Gibson et al. |
| 2012/0316924 | A1 | 12/2012 | Bruckhaus et al. |
| 2012/0323613 | A1 | 12/2012 | Sunshine et al. |
| 2013/0124234 | A1 | 5/2013 | Nilsson et al. |
| 2013/0132136 | A1 | 5/2013 | Sunshine et al. |
| 2013/0144665 | A1 | 6/2013 | Denker et al. |
| 2013/0144666 | A1 | 6/2013 | Denker et al. |
| 2013/0151294 | A1 | 6/2013 | Denker et al. |
| 2013/0151295 | A1 | 6/2013 | Denker et al. |
| 2013/0159031 | A1 | 6/2013 | Sunshine et al. |
| 2013/0159032 | A1 | 6/2013 | Sunshine et al. |
| 2013/0166336 | A1 | 6/2013 | Bascombe |
| 2013/0173319 | A1 | 7/2013 | Thomas et al. |
| 2013/0185103 | A1 | 7/2013 | Sunshine et al. |
| 2013/0227011 | A1 | 8/2013 | Sharma et al. |
| 2013/0238372 | A1 | 9/2013 | Jordan |
| 2013/0339186 | A1 | 12/2013 | French et al. |
| 2013/0346122 | A1 | 12/2013 | Gibson et al. |
| 2014/0039945 | A1 | 2/2014 | Coady et al. |
| 2014/0095333 | A1 | 4/2014 | Zises |
| 2014/0095599 | A1 | 4/2014 | Engle |
| 2014/0100897 | A1 | 4/2014 | Bascombe |
| 2014/0100898 | A1 | 4/2014 | Bruckhaus et al. |
| 2014/0136307 | A1 | 5/2014 | Jordan et al. |
| 2014/0180734 | A1 | 6/2014 | Gibson et al. |
| 2014/0188527 | A1 | 7/2014 | Oxenham et al. |
| 2014/0188528 | A1 | 7/2014 | Oxenham et al. |
| 2014/0195278 | A1 | 7/2014 | Denker et al. |
| 2014/0249870 | A1 | 9/2014 | Fineman et al. |
| 2014/0257885 | A1 | 9/2014 | Gibson et al. |
| 2014/0257985 | A1 | 9/2014 | Gibson et al. |
| 2014/0289067 | A1 | 9/2014 | Brett |
| 2014/0289171 | A1 | 9/2014 | Bruckhaus et al. |
| 2014/0324244 | A1* | 10/2014 | Musunuri ............. G05B 15/02 |
| | | | 700/299 |
| 2014/0324628 | A1 | 10/2014 | Dubin et al. |
| 2015/0025918 | A1 | 1/2015 | Sherman |
| 2015/0095247 | A1 | 4/2015 | Duan |
| 2015/0100869 | A1 | 4/2015 | Sunshine et al. |
| 2015/0161525 | A1 | 6/2015 | Hirose et al. |
| 2015/0161529 | A1 | 6/2015 | Kondaji et al. |
| 2015/0271631 | A1 | 9/2015 | Porter |
| 2015/0285527 | A1* | 10/2015 | Kim ....................... G05B 15/02 |
| | | | 700/276 |
| 2016/0005015 | A1* | 1/2016 | Curtis .................. G06Q 20/145 |
| | | | 705/40 |
| 2016/0275527 | A1 | 9/2016 | Friss |
| 2017/0076229 | A1 | 3/2017 | Sunshine et al. |
| 2017/0315523 | A1* | 11/2017 | Cross ..................... G05B 17/02 |
| 2017/0317528 | A1* | 11/2017 | Fife ....................... G05B 17/02 |
| 2019/0180297 | A1 | 6/2019 | Bhatia et al. |
| 2020/0273055 | A1 | 8/2020 | Smith |
| 2020/0274389 | A1* | 8/2020 | Islam .................... G06Q 50/06 |
| 2021/0285671 | A1* | 9/2021 | Du ....................... G05B 13/027 |
| 2022/0090805 | A1* | 3/2022 | Vitullo .................... F24F 11/62 |

OTHER PUBLICATIONS

Chen, Qi, et al, "Real-Time Dynamic Pricing with Minimal and Flexible Price Adjustment," Nov. 23, 2015, Management Science, vol. 62, No. 8 (Aug. 2016), pp. 2437-2455 (Year: 2015).*

(56) References Cited

OTHER PUBLICATIONS

DiMicco, Joan, et al, "Learning Curve: A Simulation-Based Approach to Dynamic Pricing," Jul. 2003, Electronic Commerce Research vol. 3, pp. 245-276 (Year: 2003).*

Iyengar, Srinivasan, et al, "A Cloud-Based Black-Box Solar Predictor for Smart Homes," Aug. 24, 2017, ACM Transactions on Cyber-Physical Systemsvol. 1Issue 4Article No. 21pp. 1-24 (Year: 2017).*

"Deal Score," downloaded from https://seatgeek.com/deal-score at least as early as Jul. 1, 2020, 2 pgs.

"The Math Behind Ticket Bargains—ChairNerd," downloaded from https://chairnerd.seatgeek.com/the-math-behind-ticket-bargains at least as early as Jul. 1, 2020, 5 pgs.

"Cloud" definition, Tech Terms (Year: 2016), 2016, 1 pg.

"Web application" definition, Tech Terms (Year: 2018), 2018, 2 pgs.

"Cloud-based" definition, Collins Dictionary (Year: 2018), 2018, 3 pgs.

* cited by examiner

METHOD FOR CONTROLLING REMOTE SYSTEM SETTINGS USING CLOUD-BASED CONTROL PLATFORM

CROSS REFERENCE TO RELATED APPLICATIONS

This application is a continuation-in-part of U.S. patent application Ser. No. 16/986,358, filed Aug. 6, 2020. The above-referenced priority application is hereby incorporated by reference.

BACKGROUND

The following description relates to a computer-implemented, cloud-based control platform.

Many types of systems are controlled via Internet. For example, control data for internet-of-things (IoT) devices such as thermostats, cameras, televisions, alarm systems and the like are often provided from a remote Internet-based system that generates the control data based on user inputs. As another example, Internet-based systems may be used to actively manage and control industrial equipment, manufacturing systems, remotely-controlled aircraft and vehicles, and other complex systems.

DETAILED DESCRIPTION

Figure 1:
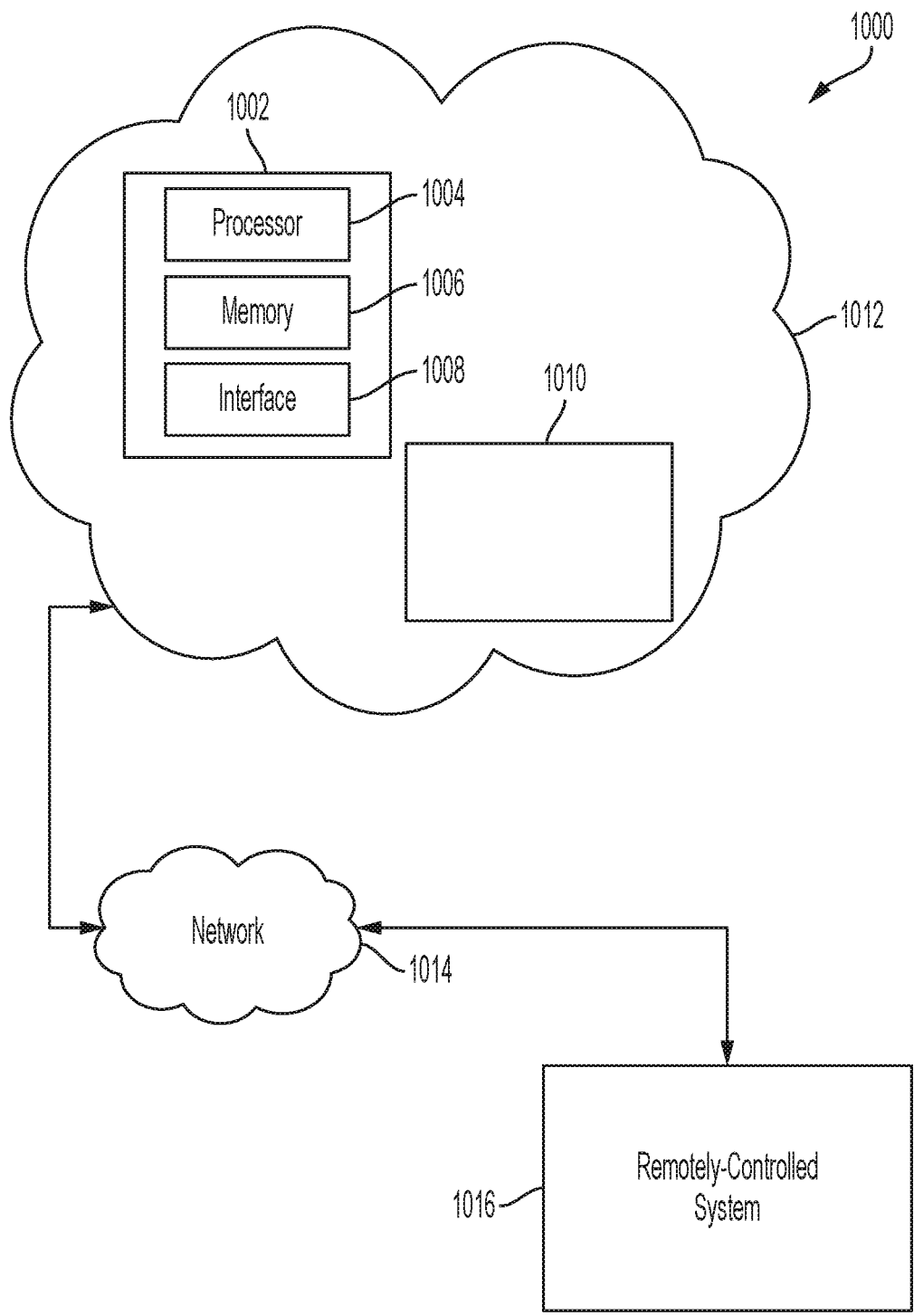
FIG. 1 is a block diagram showing aspects of an example computing environment.

In some aspects of what is described here, a computer-implemented, cloud-based data management platform interacts with disparate computer systems over various networks and manages large amounts of data with precise timing. The cloud-based data management platform may be used in a variety of contexts where large amounts of data need to be managed, where seamless and precisely-timed communications with disparate computer systems is needed, and where assets need to adjust to changing conditions at precise times. Examples of such contexts include thermostats, drones, automated cleaning robots, automobiles with remote-starting capability, sprinkling systems for a lawn, lighting systems, or any other device for which changing conditions can require an update in operations. For example, the detection of rainfall can result in a remotely-controlled automatic lawn sprinkling system being directed to defer its activation. In another example, seasonal changes in ambient light can result in a remotely-controlled lighting system adjusting its schedule.

Many devices and systems, while executing against a programmed schedule, are unable to adjust their schedule in the presence of mitigating factors, e.g., a sprinkler system that is unable to recognize that it is raining. Determination of such an external factor can allow deferral of unnecessary watering. In addition, being able to use a measurement of the moisture in the soil over time as an input to a watering schedule can result in healthier turf as well as a more economical and environmentally-friendly use of water.

In another example, a remotely-controlled home thermostat with a temperature schedule can benefit from an awareness of outside temperature and the overall load on the power grid. Data on the change in outside temperature over the course of the day can result in a more efficient and economical use of heat and/or air conditioning. Furthermore, a schedule for household temperature settings over the course of a day can be tuned by information on overall power consumption across a power system. A schedule for cooling, on an unseasonably hot day, can be adjusted using localized inputs so as to avoid taxing the power grid.

In some aspects of what is described here, a cloud-based computer system can leverage virtually unlimited computing resources to generate precisely-timed control information for remotely-controlled systems. Examples of remotely-controlled systems include a thermostat, a drone, an automated cleaning robot, an automobile with remote-starting capability, a sprinkling system for a lawn, a lighting system, or any other mechanism in which a response is desired for the existence of a condition. Such a remotely-controlled system can rely on a series of iterative adjustments for future time points by comparing current values of variables with target criteria and, as a result, iteratively updating the remotely-controlled system to improve its accuracy and efficiency.

By deploying such computations and control functions on a cloud-based control platform, the resources of the remotely-controlled systems can be conserved and utilized for system operation. In addition, the cloud-based control platform can serve as a shared resource for a number of remotely-controlled systems. For example, a cloud-based control platform can provide a centralized, efficient solution for controlling operations of disparate systems in a global network managed by an enterprise or other entity.

FIG. 1 is a block diagram showing aspects of an example computing environment 1000. The example computing environment 1000 shown in FIG. 1 includes three nodes—two cloud nodes 1002, 1010 operating as a cloud-based control platform 1012, and a remotely-controlled system 1016. The nodes communicate with each other over a network 1014. The computing environment 1000 may include additional or different features, and the components in a computing environment may be configured to operate as shown in FIG. 1 or in another manner.

Nodes in the computing environment 1000 may have a client-server relationship. For example, the cloud-based control platform 1012 can be a server and the remotely-controlled system 1016 can be its client. In some implementations, nodes in the computing environment 1000 may have a peer-to-peer relationship. Nodes may have another type of relationship in the computing environment 1000. Similarly, the remotely controlled system 1016 may include multiple nodes.

In the example shown in FIG. 1, the example nodes 1002, 1010 and the remotely-controlled system 1016 each have computational resources (e.g., hardware, software, firmware) that are used to perform computational tasks and communicate with other nodes. As shown in FIG. 1, the example node 1002 includes a processor 1004, a memory 1006, and an interface 1008. Each of the nodes 1002, 1010, and 1016 may include the same, additional, or different components. The nodes 1002, 1010, and 1016 may be configured to operate as shown and described with respect to FIG. 1 or in another manner.

In the example node 1002 shown in FIG. 1, the memory 1006 can include, for example, random access memory (RAM), a storage device (e.g., a writable read-only memory (ROM) or others), a hard disk, or another type of storage medium. The example memory 1006 can store instructions (e.g., computer code, a computer program, etc.) associated with an operating system, computer applications, and other resources. The memory 1006 can also store application data and data objects that can be interpreted by one or more applications or virtual machines running on the node 1006. The node 1006 can be preprogrammed, or it can be programmed (and reprogrammed), by loading a program from another source (e.g., from a DVD-ROM, from a removable memory device, from a remote server, from a data network, or in another manner). In some cases, the memory 1006 stores computer-readable instructions for software applications, scripts, programs, functions, executables, or other modules that are interpreted or executed by the processor 1004.

In the example node 1002 shown in FIG. 1, the processor 1004 can execute instructions, for example, to generate output data based on data inputs. For example, the processor 1004 can run computer programs by executing or interpreting the software, scripts, programs, functions, executables, or other modules stored in the memory 1006. The example processor 1004 shown in FIG. 1 can include one or more chips or chipsets that include analog circuitry, digital circuitry, or a combination thereof. In some cases, the processor 1004 includes multiple processor devices such as, for example, one or more main processors and one or more co-processors. In some instances, the processor 1004 coordinates or controls operation of other components of the node 1002, such as, for example, user interfaces, communication interfaces, and peripheral devices.

In the example node 1002 shown in FIG. 1, the interface 1008 provides communication with other nodes or devices. In some cases, the interface 1008 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 1008 includes a wired communication interface (e.g., USB, Ethernet) that can be connected to one or more input/output devices, such as, for example, a keyboard, a pointing device, a scanner, or a networking device such as a switch or router, for example, through a network adapter.

The example network 1014 can include all or part of a connector, a data communication network, or another type of communication link. For example, the network 1014 can include one or more wired or wireless connections, one or more wired or wireless networks or other communication channels. In some examples, the network 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown in FIG. 1, the example cloud-based control platform 1012 sends control data to the remotely-controlled system 1016, and the remotely-controlled system 1016 adjusts local settings based on the control data. In some cases, the cloud-based control platform 1012 maintains data objects for assets controlled by the cloud-based control platform 1012, and the data objects include templates that specify values of a variable setting associated with the assets.

The example remotely-controlled system 1016 can be, for example, an internet-of-things device, a computer system, or another type of system that is controlled by a computer. In an example, a remotely-controlled lighting system adjusts its on- and off-times based on seasonal changes in the times of dusk and dawn, and the cloud-based control platform 1012 controls the variable light setting of the remotely-controlled lighting system. In an example, photocells on the lighting system provide information to a cloud-based computer system. As a result, future time points of lighting are determined by the cloud-based control platform 1012 and communicated to the remotely-controlled lighting system.

In another example, to control power consumption, a remotely-controlled Internet of Things (IOT) household thermostat is adjusted based upon change in the outside temperature with additional information on power consumption across a power system, and the cloud-based control platform 1012 controls the variable thermostat settings. From a determination of a rate of change in outside temperature, the cloud-based control platform 1012 can adjust the thermostat from its normal setting to optimize air conditioning over time, while avoiding a usage of power that could destabilize the power grid. The cloud-based control platform 1012 can remotely control variable settings of other IOT devices in a similar manner.

In yet another example, a remotely-controlled irrigation system for an agricultural asset provides information regarding temperature changes and soil moisture levels throughout the day. As a result, the cloud-based control platform 1012 provides control data to adjust the location, time, and duration of irrigation across the growing season. The irrigation system can allow variations in daily temperature and soil moisture to revise seasonal plans based on local/current values.

In another example, a remotely-controlled computer system adjusts data and settings in response to control data provided by the cloud-based control platform 1012. For example, the remotely-controlled computer system can be an internet-based service (e.g., a social network, an online banking system, a virtual meeting host, a sales platform, or another type of service), and the cloud-based control platform 1012 can specify variable settings of the internet-based service over time.

Accordingly, the cloud-based control platform 1012 can provide technical advantages and improvements over conventional systems. For instance, the cloud-based control platform 1012 can address the Internet-centric challenge of deploying precisely-timed updates for variable settings on a variety of systems that are controlled over the Internet. For instance, the updates for multiple different types of systems across global networks can be coordinated from a centralized control system that monitors hyperparameters, maintains and updates templates that specify variable settings over time, and continuously pushes updates to the remotely-controlled systems over the Internet. Accordingly, the process of maintaining and updating templates improves the operation and functioning of the particular technological environment of the remotely-controlled system. For example, the remotely-controlled system may operate more efficiently or precisely by updating local settings based on control data provided by the cloud-based control platform 1012. Thus, the technical solution provided by the cloud-based control platform is necessarily rooted in computer technology, and overcomes a problem specifically arising in the realm of computer systems.

Figure 2:
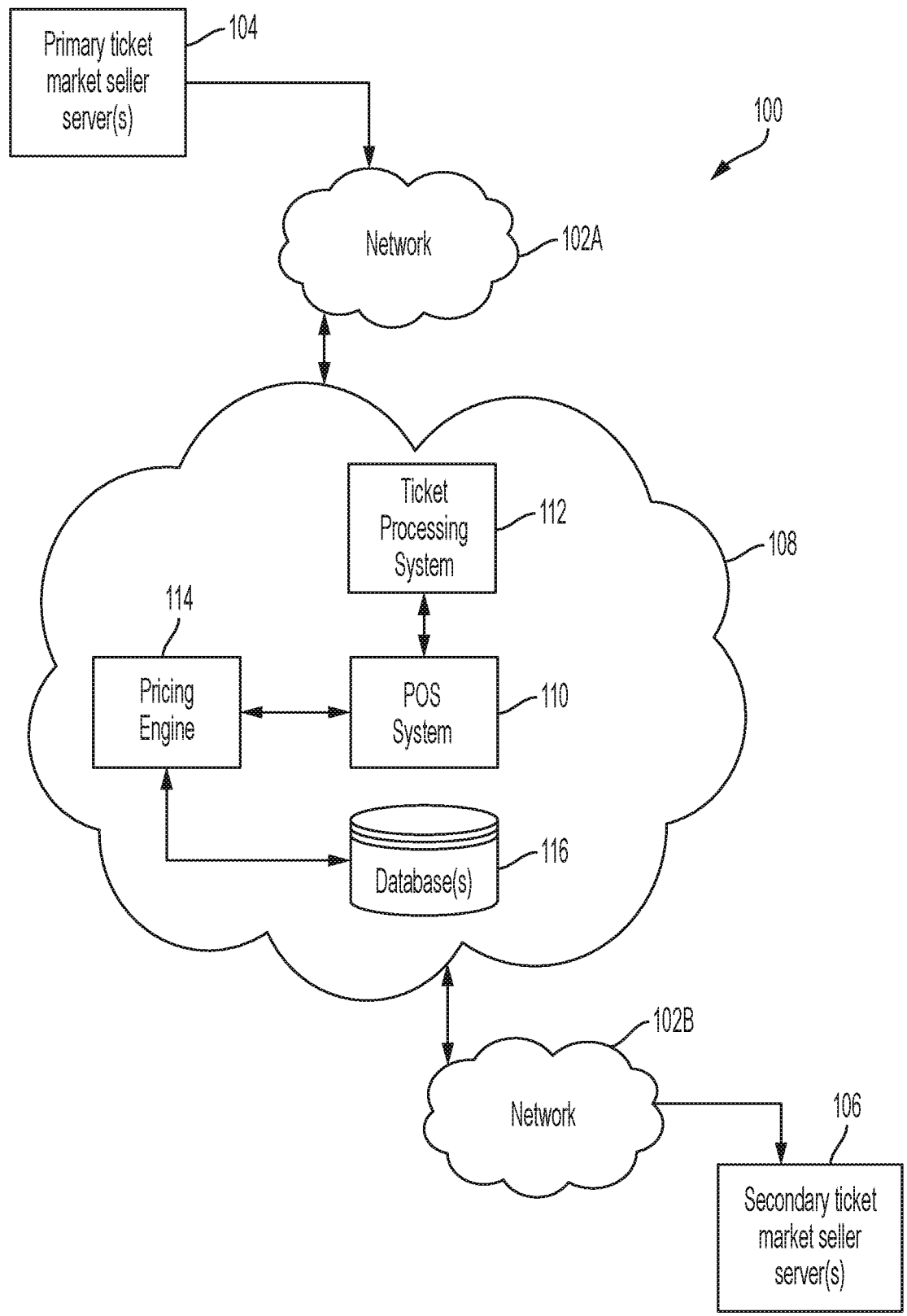
FIG. 2 is a diagram showing an example management system.
Figure 4:
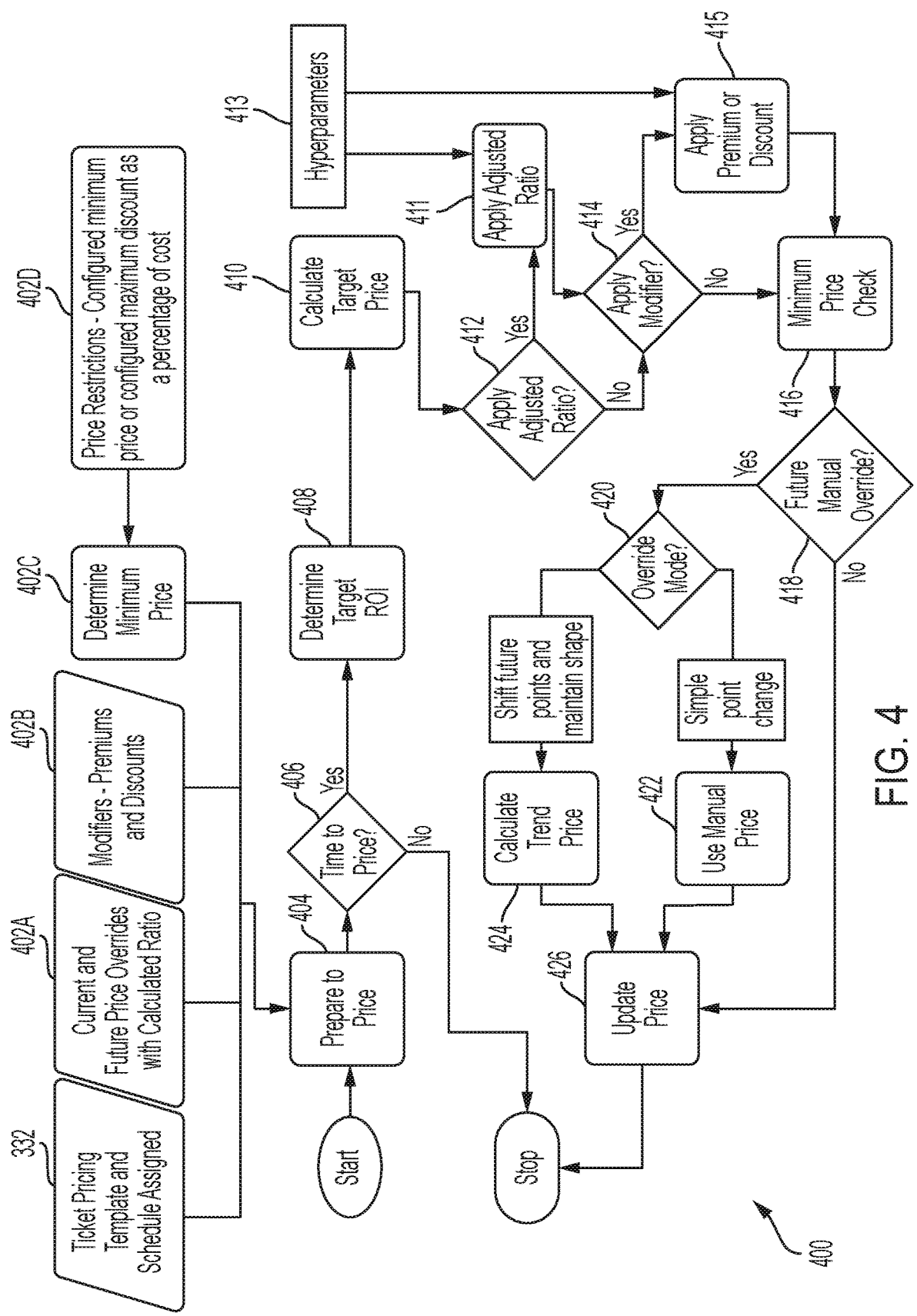
FIG. 4 shows an example flowchart that illustrates how an updated offering price of a ticket is calculated by a ticket pricing engine of a ticket broker platform.

One specific example of a remotely-controlled computer system that can be controlled by the cloud-based control platform 1012 of FIG. 1 is the secondary ticket market seller servers 106 shown in FIG. 2, where ticket prices are an example of variable settings associated with remotely-controlled assets. In such cases, the cloud-based control platform 1012 can operate as ticket broker platform 108 shown in FIG. 2 that remotely controls the ticket prices on the secondary ticket market seller servers 106. In some examples, the cloud-based control platform 1012 maintains a database (e.g., 116 in FIG. 2) of data objects for each remotely-controlled asset. The data objects for each remotely-controlled asset includes static hyperparameters and dynamic hyperparameters associated with the asset (e.g., the hyperparameters 413 shown in FIG. 4 or other types of hyperparameters). The data objects for each remotely-controlled asset also include a template (e.g., at 332 in FIG. 4) that specifies values of a variable associated with the asset (e.g., ticket price) for a plurality of future time points. The cloud-based control platform 1012 can use an update process to determine an updated template for one of the data objects (e.g., as shown in FIG. 4). The update process can include calculating target values for the variable for the plurality of future time points based on a target criterion (e.g., at 410 in FIG. 4), communicating with one or more remote computer systems to determine current values of the dynamic hyperparameters, determining a ratio based on the current values of the dynamic hyperparameters, calculating scaled values for the plurality of future time points by applying the ratio to the target values (e.g., at 411 in FIG. 4), determining an adjustment based on the static hyperparameters, calculating first modified values for the plurality of future time points by applying the adjustment to the scaled values (e.g., at 415 in FIG. 4), calculating second modified values for the plurality of future time points by applying an override value to the first modified values (e.g., at 426 in FIG. 4), and assigning the second modified values to the template. The cloud-based control platform 1012 can iteratively update the remotely-controlled system (e.g., the secondary ticket market seller servers 106 shown in FIG. 2) according to the updated template at each of the plurality of future time points. Updating the remotely-controlled system can include identifying a next value of the variable, wherein the next value of the variable can be the value specified by the updated template for a time point associated with a current time, and communicating the next value to the remotely-controlled system with instructions to assign the next value of the variable to a setting associated with the remotely-controlled asset.

Another specific example of a remotely-controlled computer system that can be controlled by the cloud-based control platform 1012 of FIG. 1 is a booking platform server for hotel rooms and other types of lodging (e.g., vacation rentals, by-owner rentals, etc), where lodging prices are an example of variable settings associated with remotely-controlled assets. In such cases, the cloud-based control platform 1012 can operate as a booking platform that remotely controls lodging prices on the booking platform server system. In some examples, the cloud-based control platform 1012 maintains a database of data objects for each remotely-controlled asset (e.g., each hotel room, rental property, etc.). The data objects for each remotely-controlled asset can include static hyperparameters (e.g., location, size, amenities, etc.) and dynamic hyperparameters (e.g., weather, local events, travel restrictions, etc.) associated with the asset. The data objects for each remotely-controlled asset can also include a template that specifies values of a variable associated with the asset (e.g., nightly price, etc.) for a plurality of future time points. The cloud-based control platform 1012 can use an update process to determine an updated template for one of the data objects. The update process can include calculating target values for the variable for the plurality of future time points based on a target criterion, communicating with one or more remote computer systems to determine current values of the dynamic hyperparameters, determining a ratio based on the current values of the dynamic hyperparameters, calculating scaled values for the plurality of future time points by applying the ratio to the target values, determining an adjustment based on the static hyperparameters, calculating first modified values for the plurality of future time points by applying the adjustment to the scaled values, calculating second modified values for the plurality of future time points by applying an override value to the first modified values, and assigning the second modified values to the template. The cloud-based control platform 1012 can iteratively update the booking platform server according to the updated template at each of the plurality of future time points. Updating the booking platform server can include identifying a next value of the variable, wherein the next value of the variable can be the value specified by the updated template for a time point associated with a current time, and communicating the next value to the booking platform server with instructions to assign the next value of the variable to a setting associated with the remotely-controlled asset.

Yet another specific example of a remotely-controlled computer system that can be controlled by the cloud-based control platform 1012 of FIG. 1 is an online marketplace server system, where prices of marketplace items (e.g., retail items, resell items, etc.) are an example of variable settings associated with remotely-controlled assets. In such cases, the cloud-based control platform 1012 can operate as an item broker platform that remotely controls marketplace item prices on the online marketplace server system. In some examples, the cloud-based control platform 1012 maintains a database of data objects for each remotely-controlled asset. The data objects for each remotely-controlled asset can include static hyperparameters (e.g., item condition, item properties, shipping prices, etc.) and dynamic hyperparameters (e.g., quantity available, competing items available, etc.) associated with the asset. The data objects for each remotely-controlled asset can also include a template that specifies values of a variable associated with the asset (e.g., item price) for a plurality of future time points. The cloud-based control platform 1012 can use an update process to determine an updated template for one of the data objects. The update process can include calculating target values for the variable for the plurality of future time points based on a target criterion, communicating with one or more remote computer systems to determine current values of the dynamic hyperparameters, determining a ratio based on the current values of the dynamic hyperparameters, calculating scaled values for the plurality of future time points by applying the ratio to the target values, determining an adjustment based on the static hyperparameters, calculating first modified values for the plurality of future time points by applying the adjustment to the scaled values, calculating second modified values for the plurality of future time points by applying an override value to the first modified values, and assigning the second modified values to the template. The cloud-based control platform 1012 can iteratively update the online marketplace server system according to the updated template at each of the plurality of future time points. Updating the online marketplace server system can include identifying a next value of the variable, wherein the next value of the variable can be the value specified by the updated template for a time point associated with a current time, and communicating the next value to the online marketplace server system with instructions to assign the next value of the variable to a setting associated with the remotely-controlled asset.

FIG. 2 shows an example ticket management system 100. The ticket management system 100 facilitates a ticket broker's transactions between the primary ticket markets and the secondary ticket markets. The ticket management system 100 includes networks 102A, 102B, one or more primary ticket market seller servers 104, one or more secondary ticket market seller servers 106, and a computer-implemented, cloud-based ticket broker platform 108. The network 102A communicatively couples the primary ticket market seller servers 104 and the ticket broker platform 108, while network 102B communicatively couples the ticket broker platform 108 and the secondary ticket market seller servers 106.

In some implementations, the networks 102A, 102B include the Internet, one or more telephony networks, one or more network segments including local area networks (LANs) and wide area networks (WANs), one or more wireless networks, or a combination thereof.

In some implementations, a cloud-based platform may be a cloud-based ticket broker platform that allows a ticket broker to effectively manage large volumes of data related to the sale of event tickets. For example, in some implementations, the cloud-based ticket broker platform may allow ticket brokers to effectively manage thousands of event tickets in their ticket portfolios, seamlessly communicate with different sales tools and sales platforms (each of which may have their own API, rules, etc.), and quickly and precisely update ticket prices at scheduled times in order to be competitive with a change in demand as the event nears.

Tickets for events, such as sporting events and concerts, are typically sold first on a primary market ticket exchange and often resold on a secondary market ticket exchange. For example, event tickets are typically sold in primary markets (e.g., TicketMaster, Live Nation, or AXS) far in advance of the event, sometimes over a year in advance. Ticket brokers purchase at least a portion of their inventory (or ticket portfolio) from the primary ticket markets. Consumers can also purchase tickets directly from primary markets just like ticket brokers. Other than familiarity with the purchasing process, ticket brokers typically do not have a competitive advantage over everyday consumers when purchasing tickets from the primary markets.

Typically, however, consumers often wait until closer to the event date before deciding to attend an event. Those consumers may find that tickets for popular events are no longer available in primary markets (e.g., the event is sold out), and must purchase those tickets in secondary markets.

Generally, there are two main categories of sellers who resell tickets on the secondary market. The first category includes individuals who have tickets (e.g., season or non-season tickets) and wish to sell seats for events they cannot attend. The second category includes ticket brokers that purchase at least a part of their ticket inventory (also referred to as ticket portfolio, which includes both season and non-season tickets) from one or more primary market ticket exchanges.

In some aspects of what is described here, a computer-implemented, cloud-based ticket broker platform is provided. In some instances, the computer-implemented, cloud-based ticket broker platform includes a pricing engine and provides technical improvements and advantages over existing approaches. For example, the systems and techniques described here provide an efficient, computer-implemented, cloud-based ticket broker platform that reduces manual interventions, precisely schedules changes to ticket prices, and allows for the seamless management of higher ticket volumes. For example, the cloud-based ticket broker platform manages large amounts of data related to the sale of event tickets, provides for seamless and precisely-timed communications with disparate computer systems, and precisely times the prices of the tickets to a changing market so that the tickets remain competitively priced.

The one or more primary ticket market seller servers 104 can include, for example, the ticket management systems of one or more primary market ticket exchanges. The primary market ticket exchange(s) may function as distributors for an event venue, although event venues can distribute the tickets themselves if they are so inclined. As an example, primary market ticket exchange(s) sell tickets on behalf of sports teams, concert promoters, etc., or can represent the ticket management systems (e.g., event or concert promoter) of the actual performers or teams themselves. Therefore, the primary market ticket exchanges offer tickets for sale directly to purchasers and have technology in place which allows teams, artists, and promoters to have their tickets listed and marketed. In some examples, primary market ticket exchanges function as distributors and guarantors of the tickets sold. For example, as a guarantor of the tickets, a broker can contact the primary market ticket exchange (which is the merchant) if the broker has an issue with the ticket purchased from the primary market ticket exchange. Example primary market ticket exchanges that brokers use and that act as distributors include Ticketmaster, Live Nation Entertainment, AEG (AXS.com), Ticketfly, Eventbrite, eTix. Primary market ticket exchanges may also be grouped by region, brand, or genre, examples being Telecharge and ComcastTIX.

The one or more secondary ticket market seller servers 106 can include, for example, the ticket management systems of one or more secondary market exchanges which enable the buying and selling of tickets previously purchased in the primary market. The secondary ticket market seller servers 106 process sales, settle payments, and facilitate the ticket delivery from ticket brokers to consumers. In some examples, if the final consumer has an issue with the ticket purchased from the secondary market ticket exchange, the consumer can contact the secondary market ticket exchange, which in turn contacts the broker, who in turn resolves the issue or contacts the primary market ticket exchange. Example secondary market ticket exchanges include Tickets.com, StubHub, Vivid Seats, TicketsNow, SeatGeek, TicketNetwork, Ticket Evolution, Out of This World, and others.

The computer-implemented, cloud-based ticket broker platform 108 shown in the example of FIG. 2 allows a ticket broker to purchase tickets for their ticket portfolio and to process tickets in their ticket portfolio before the tickets are listed on secondary market ticket exchanges and sold to the final consumer. The example ticket broker platform 108 includes a broker point of sale (POS) system 110, a ticket processing system 112, a pricing engine 114, and one or more databases 116. The POS system 110 functions as a central hub of operations of the ticket broker platform 108, while the ticket processing system 112, pricing engine 114, and database(s) 116 operate as spokes of the POS system 110. In some implementations, a broker purchases tickets from the primary market ticket exchange servers 104; the purchased tickets get processed and ported over to the POS system 110, thereby becoming a part of the broker's ticket portfolio. In some implementations, the POS system 110 communicates with the secondary market ticket exchange servers 106, ticket processing system 112, pricing engine 114, and one or more databases 116 via respective application programming interface (API) calls.

In some implementations, the POS system 110 is configured to manage the broker's ticket portfolio and ticket sales. For example, in some implementations, the POS system 110 executes an automated process that lists tickets from the broker's ticket portfolio for sale on multiple secondary market ticket exchanges and, when a sale of a ticket is completed, removes the ticket's listing from all secondary market ticket exchanges. For example, the POS system 110 reads information for new inventory, posts that information on the various secondary exchanges (including periodic listing price updates), removes listings from the secondary market ticket exchange servers 106 after the sale of a ticket thereon, and stores results of the sale for the broker to process (e.g., so that the broker can generate performance reports). In some implementations, the pricing engine 114 is used to automatically and continuously price the tickets in the broker's ticket portfolio. For example, the pricing engine 114 may be configured to update the offering prices of tickets in the broker's ticket portfolio at specified instances of time. The updated offering prices of the tickets are then provided by the pricing engine 114 to the POS system 110 so that the updated offering prices are reflected on the secondary market ticket exchange servers 106. This automatic and continuous forecasting and updating of ticket prices can be set for the entire period between the tickets' date of purchase (e.g., from the primary ticket market seller servers 104) up until the event date, thereby significantly increasing efficiency by reducing manual interventions, precisely scheduling changes to ticket prices, and allowing for the seamless management of higher ticket volumes.

The ticket processing system 112 may include one or more processors, examples being central processing units (CPUs), graphics processing units (GPUs), a multi-processor core, or any other type of processor, depending on the particular implementation. In some implementations, the ticket processing system 112 may be integrated into the broker POS system 110. In some implementations, the ticket processing system 112 acquires information from each ticket in the broker's ticket portfolio, thus generating a ticket portfolio database. The ticket portfolio database may be stored or maintained in the database(s) 116 of the ticket broker platform 108. The database(s) 116 can be, for example, random access memory (RAM) or any other suitable volatile or non-volatile computer readable storage medium. The database(s) 116 can also include storage which can take various forms, depending on the implementation. For example, the storage can contain one or more components or devices such as a hard drive, a flash memory, a rewritable optical disk, a rewritable magnetic tape, or some combination of the above. In addition, the memory and/or storage can be fixed or removable. In addition, memory and/or storage can be located remotely.

In some implementations, the pricing engine 114 uses information included in the ticket portfolio database, which includes a respective ticket profile for each ticket in the broker's ticket portfolio. The ticket profile for each ticket may specify a current offering price of the ticket on the secondary market ticket exchange servers 106, attributes of the ticket, offering price parameters, the times to calculate an updated offering price for the ticket, and one or more ticket pricing templates associated with the ticket. The attributes of the ticket may include the event name, date, time, location, seat section and number, among other information pertinent to the ticket or the event. The offering price parameters of a ticket may include a target profit to be achieved from the sale of the ticket, adjusted pricing ratios, pricing boundaries (e.g., a maximum or minimum price of the ticket), predetermined pricing premiums or predetermined pricing discounts to be applied to the offering price of the ticket, and pricing overrides that may be applied by a ticket broker to the ticket price. Furthermore, the ticket pricing template(s) associated with the ticket may specify a time-series of adjustments for the offering price of the ticket. The ticket pricing template(s) may be included in a template database, which is also stored or maintained in the database(s) 116 of the ticket broker platform 108.

Figure 2A:
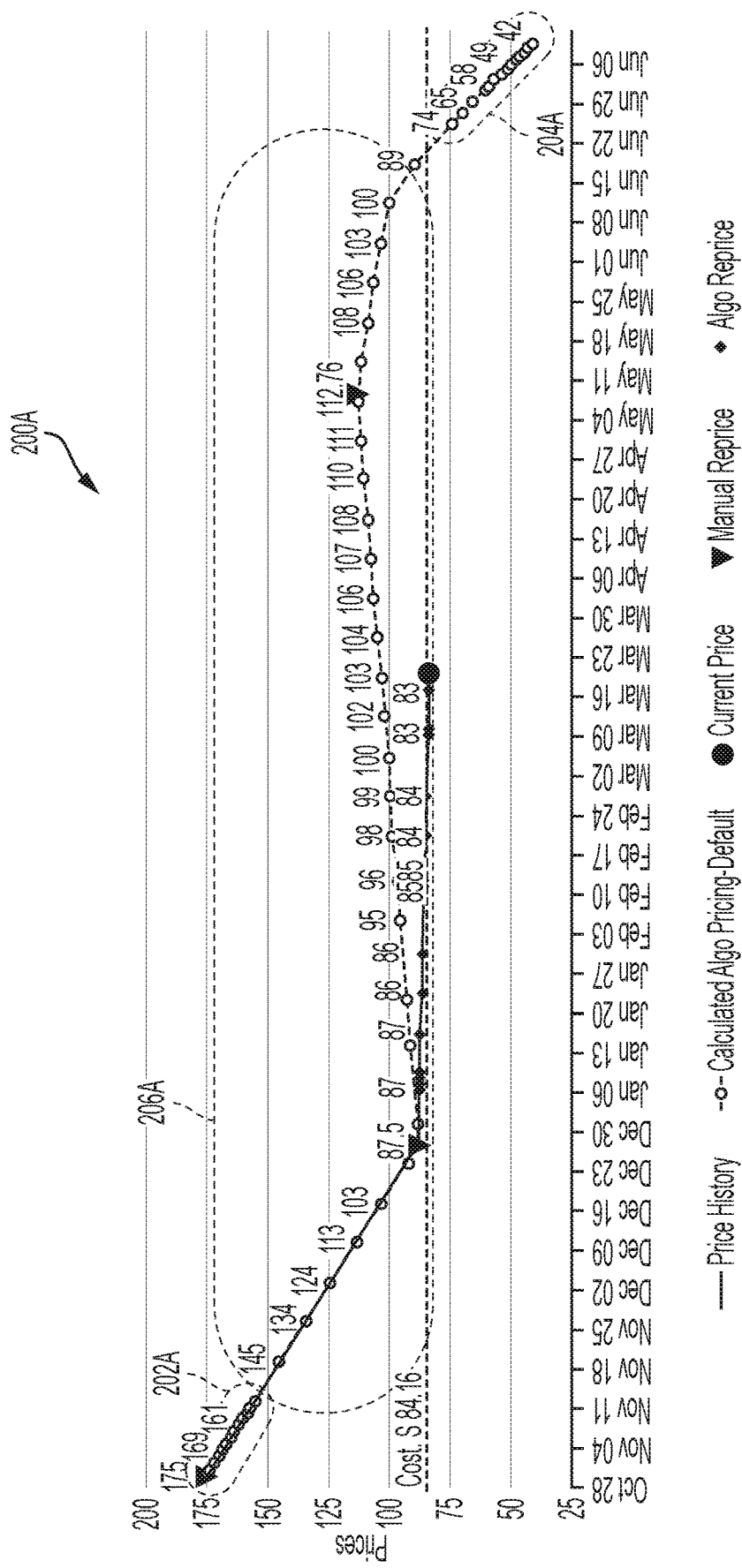
FIGS. 2A to 2C show example templates.
Figure 2B:
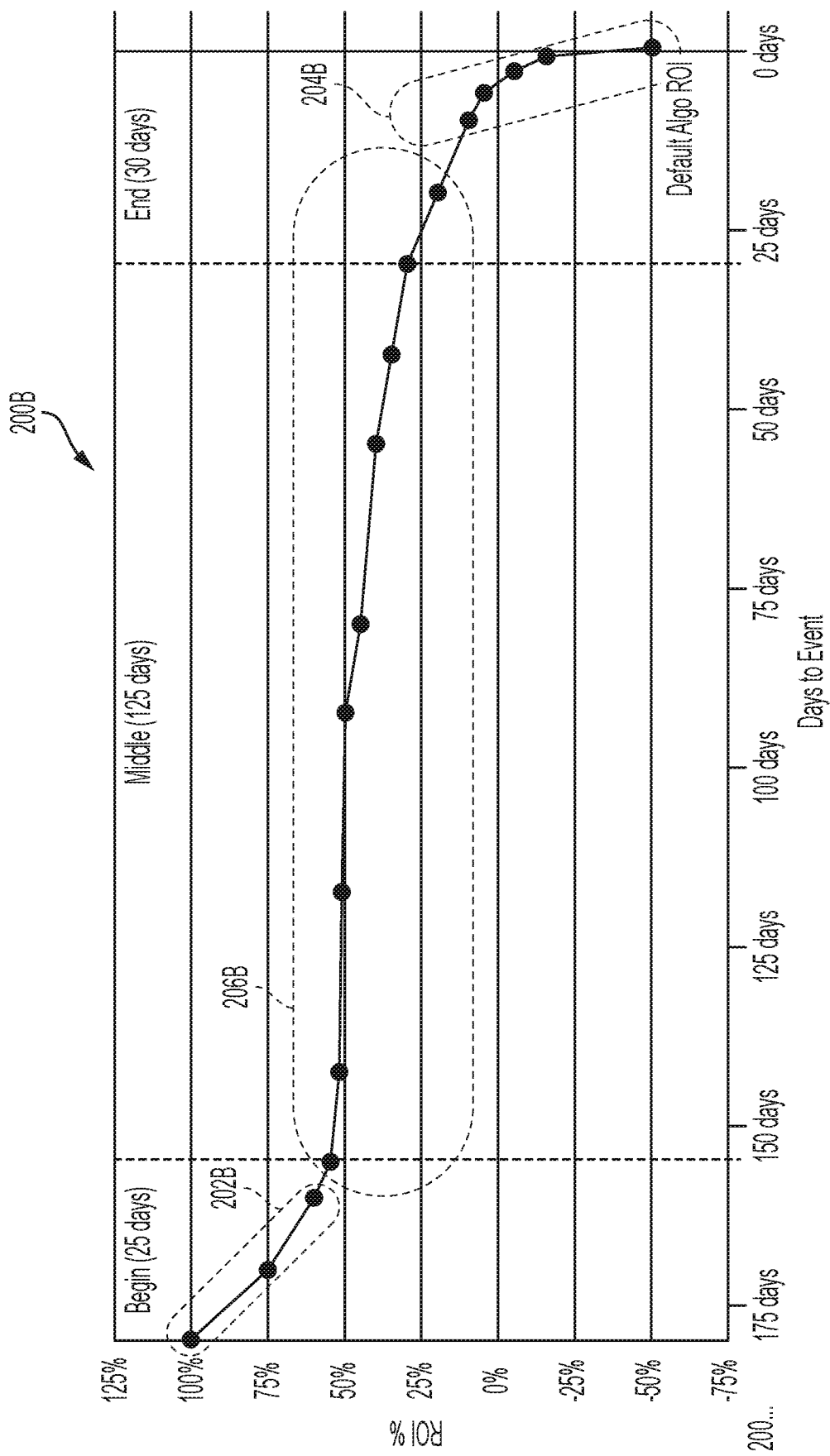
Figure 2C:
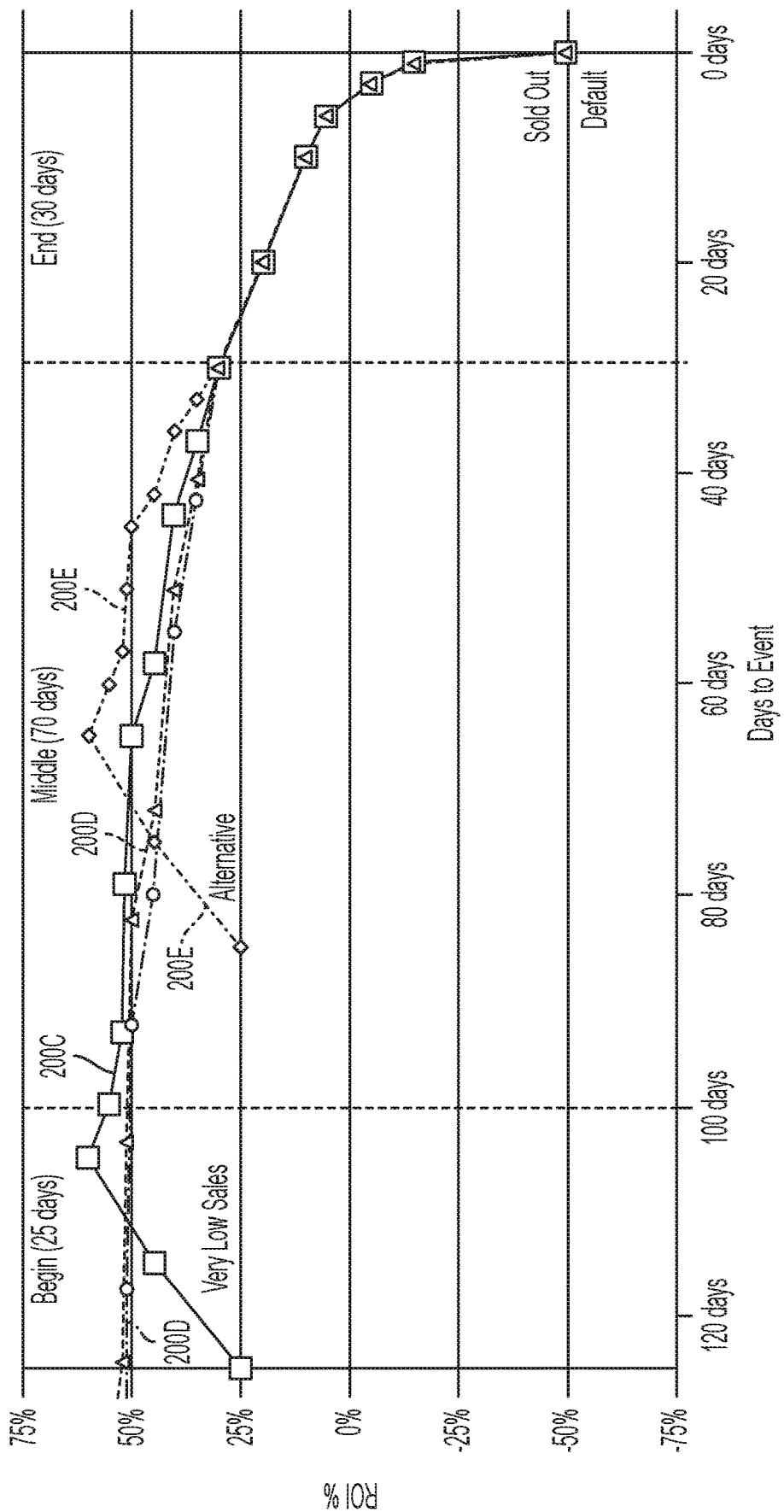

FIGS. 2A to 2C show example ticket pricing templates. As seen in FIGS. 2A to 2C, the ticket pricing templates specify how the offering price of a ticket changes over time (e.g., from a particular date up until the day of the event). In some implementations, the ticket pricing templates can be created manually by the broker or forecast from analytics. In other implementations, the ticket pricing templates may be shapes that are set by a third party. The ticket pricing template may specify how the offering price of a ticket changes over time in terms of the actual price of the ticket (e.g., as in the example of FIG. 2A) or in terms of the return on investment (ROI) (e.g., as in the examples of FIGS. 2B and 2C). Any arbitrary unit that specifies how the offering price of a ticket changes over time may be used. For example, the offering price may be expressed in actual dollar value, ROI, margin, etc. As another example, time may be expressed as days, hours, minutes, etc.

As discussed above, the ticket profile for each ticket may specify the times to calculate an updated offering price for the ticket. In some implementations, each ticket pricing template is associated with the times at which an updated offering price for the ticket is calculated. The times at which an updated offering price for the ticket is calculated can be specified by the broker, forecast from analytics, or be a combination thereof. As an example, the times at which the offering price of the ticket is updated may first be stipulated by a scheduling engine (e.g., manually defined by the broker). As described in an example below, the times stipulated by the scheduling engine may not be equally spaced in time. In some implementations, the broker can define a rule that could force a reprice of the ticket, regardless of the times stipulated by the scheduling engine. An example of such an implementation may be the reprice of the ticket at a specific time per week (e.g., at a day and time specified by the broker. In some implementations, the broker can manually override the times stipulated by the scheduling engine.

The example ticket pricing template 200A in FIG. 2A shows that the updated offering price for the ticket is calculated at various dates ranging from October 28 up until the event date of July 10. The example ticket pricing template 200B in FIG. 2B shows that the updated offering price for the ticket is calculated at various dates before the event, ranging from about 180 days before the event up until the day of the event. The example ticket pricing templates 200C to 200E show that the updated offering price for the ticket is calculated at various dates before the event, ranging from about 125 days before the event up until the day of the event.

In some implementations, the times at which an updated offering price for the ticket is calculated may not be equally spaced in time. For example, an updated offering price for the ticket may be calculated more frequently soon after the ticket is offered for sale on the secondary market ticket exchange servers 106 or closer to the event date (e.g., as seen for time periods 202A, 204A of ticket pricing template 200A and time periods 202B, 204B of ticket pricing template 200B). On the other hand, updated offering price for the ticket may be calculated less frequently in an interim time period (e.g., as seen for time period 206A of ticket pricing template 200A and time period 206B of ticket pricing template 200B).

As discussed above, the pricing engine 114 of the ticket broker platform 108 may be configured to update the offering prices of tickets in the broker's ticket portfolio (e.g., at specified instances of time). In this regard, the ticket pricing engine is configured to determine updated offering prices for the tickets in the ticket portfolio by identifying the current offering price of the ticket; identifying the offering price parameters of the ticket; identifying the ticket pricing template associated with the ticket; and calculating the updated offering price based on the current offering price for the ticket, the ticket pricing template for the ticket, and the offering price parameters for the ticket. Therefore, the pricing engine 114 automatically prices tickets for the broker using a predetermined pricing scheduler system (e.g., the ticket pricing template and the times at which an updated offering price for the ticket is calculated), whether the pricing scheduler system is forecast from analytics, by manual entry, or a combination of manual and analytical forecasting.

Figure 3A:
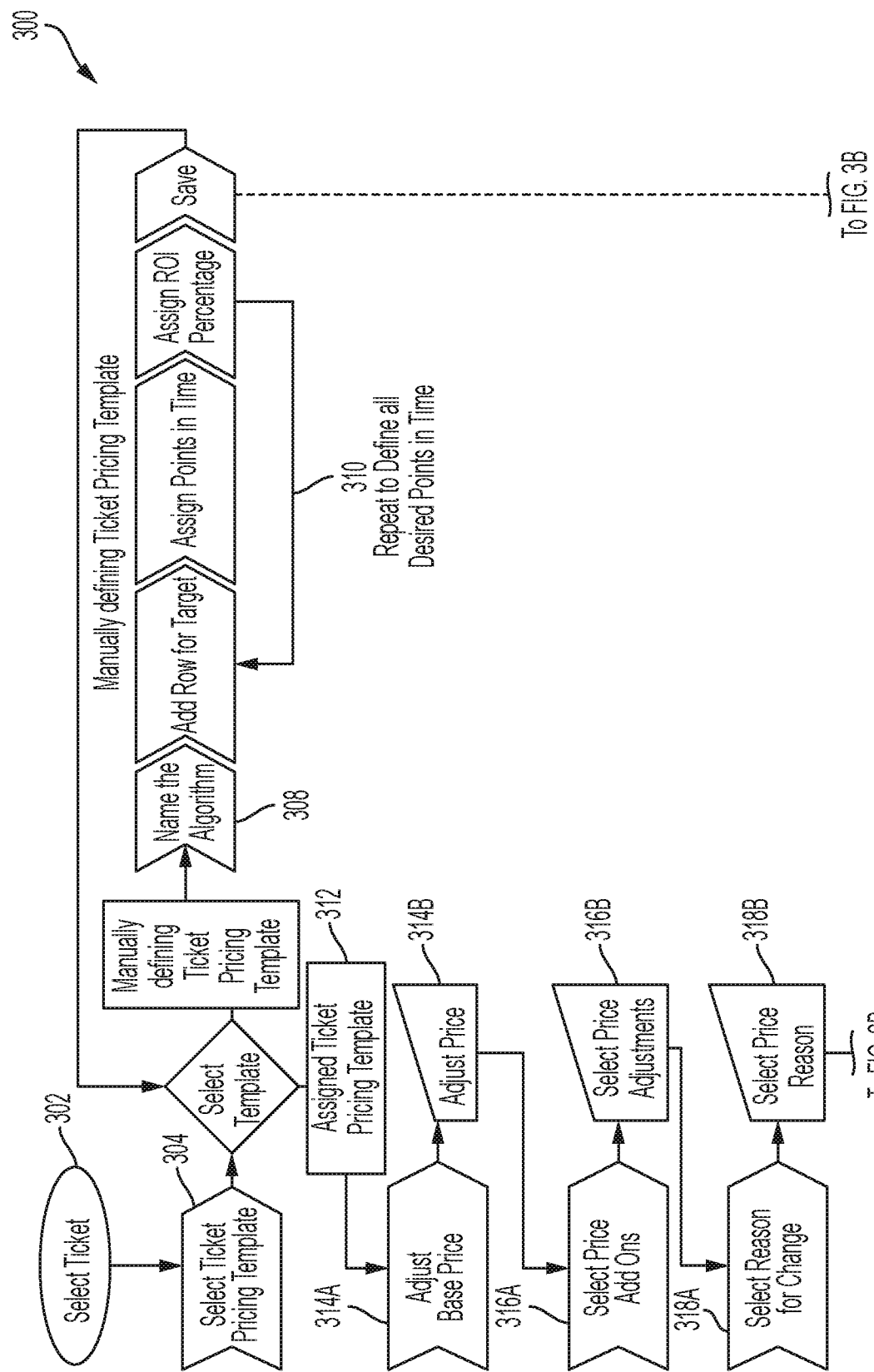
FIGS. 3A and 3B show an example flowchart that illustrates steps that may be executed by a ticket broker platform to continuously forecast and update ticket prices for any ticket in a broker's ticket portfolio.
Figure 3B:
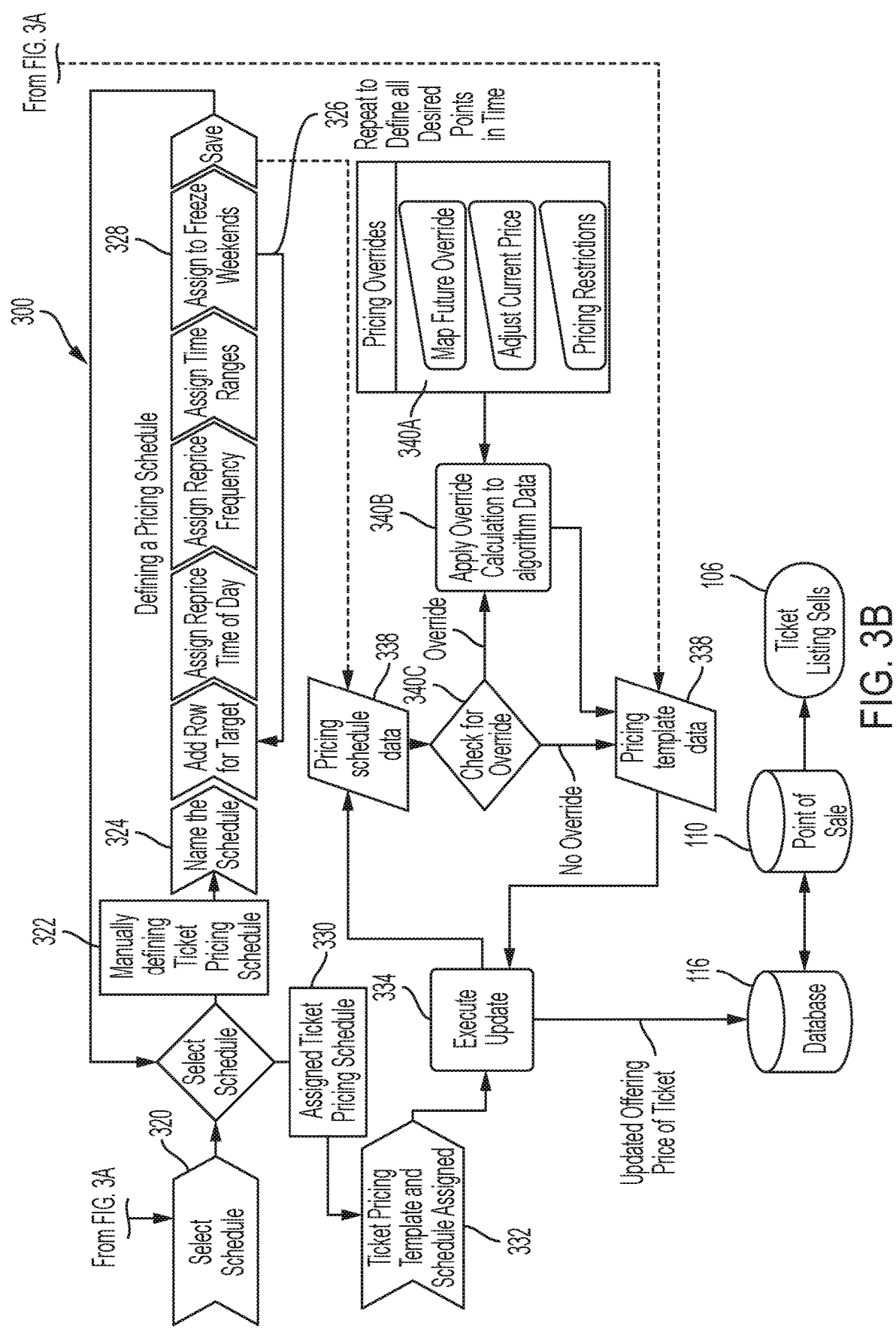

FIGS. 3A and 3B show an example flowchart 300 that illustrates steps that may be executed by the ticket broker platform 108 to continuously forecast and update ticket prices for any ticket in a broker's ticket portfolio. Specifically, FIG. 3A shows an example of how the ticket broker platform 108 finalizes the ticket pricing template associated with the ticket and the offering price parameters associated with the ticket, and FIG. 3B shows an example of how the ticket broker platform 108 selects times at which an updated offering price for the ticket is calculated and calculates the updated offering price for the ticket.

Referring to FIG. 3A, at step 302, a ticket from the broker's ticket portfolio is selected. Additionally, at step 304, a ticket pricing template that is associated with the ticket is selected. As discussed above, the ticket pricing template, which specifies how the offering price of a ticket changes over time, may be created manually by the broker or predetermined based on analytics. In implementations where the ticket pricing template is created manually by the broker (e.g., as in step 306 shown in the flowchart 300), the broker provides an appropriate naming label to the ticket pricing template (e.g., as in step 308) and iteratively defines the target ROI for the ticket at specified instances of time (e.g., as in step 310). The manually created target ROI for the ticket at the specified instances of time may subsequently define a ticket pricing template that specifies how the offering price of the ticket changes over time (e.g., as in step 312).

The broker may also set or activate offering price parameters associated with the ticket. As discussed above, the offering price parameters may include a target profit to be achieved from the sale of the ticket, adjusted pricing ratios, pricing boundaries (e.g., a maximum or minimum price of the ticket), predetermined pricing premiums or predetermined pricing discounts to be applied to the offering price of the ticket, and pricing overrides that may be applied by a ticket broker to the ticket price. In the example of FIG. 3A, the offering price parameters that are set or activated include the base price of the ticket (e.g., in steps 314A, 314B), pricing add-ons (e.g., in steps 316A, 316B), and the broker's reasons for the pricing add-ons (e.g., in steps 318A, 318B). In some implementations, other offering price parameters may be set or activated, examples being a target profit to be achieved from the sale of the ticket, adjusted pricing ratios, pricing boundaries (e.g., a maximum or minimum price of the ticket), and pricing overrides that may be applied by a ticket broker to the ticket price.

With regards to the base price, the base price of the ticket may be the starting offering price for the ticket on the secondary market ticket exchange servers 106 (e.g., before any exchange fees are applied). In some implementations, the base price may be the broker price and represents the ticket's price before exchange fees. The pricing add-ons (e.g., in steps 316A, 316B) may be additional pricing premiums or discounts that could modify the forecasted prices. In some implementations, the pricing add-ons may be derived from a variety of additional market conditions and inventory variables, such as overall quantity of tickets for an event, the number of tickets being sold in a listing, the sellout status of the section or venue, sales activity, etc. The broker's reasons for the pricing add-ons or changes (e.g., in steps 318A, 318B) serve as internal notes for the broker and assist the broker with internal auditing of the ticket portfolio. Some reasons that a broker may associate with the pricing add-ons include "repriced to market" and "change in ticket pricing template," among others. Through the steps illustrated in FIG. 3A, the ticket broker platform 108 finalizes the ticket pricing template associated with the ticket (e.g., through steps 302, 304, 306, 308, 310, 312) and the offering price parameters associated with the ticket (e.g., through steps 314A, 314B, 316A, 316B, 318A, 318B). As discussed above, the ticket pricing template, the offering price parameters, along with other attributes of the ticket profile may be stored in the database(s) 116 of the ticket broker platform 108.

Referring to FIG. 3B, at step 320, a ticket pricing schedule is selected. As discussed above, the ticket pricing schedule, which specifies the times at which an updated offering price for the ticket is calculated, may be created manually by the broker or predetermined based on analytics. In implementations where the ticket pricing schedule is created manually by the broker (e.g., as in step 322 shown in the flowchart 300), the broker provides an appropriate naming label to the ticket pricing schedule (e.g., as in step 324) and iteratively defines the times and days at which the updated offering price for the ticket is calculated (e.g., as in step 326). In some implementations, even if updated offering prices are to be calculated at a particular day, the broker may freeze such calculations because the particular day falls on a weekend (e.g., as in step 328). The resultant ticket pricing schedule (e.g., as in step 330) is then used in tandem with the selected ticket pricing template (e.g., as in step 312). For example, step 332 shows the use of both the selected ticket pricing schedule and the selected ticket pricing template in calculating the updated offering price of a ticket.

The updated offering price of a ticket is calculated (e.g., as in step 334) by the pricing engine 114 of the ticket broker platform 108, taking into account the current offering price of the ticket, data from the ticket pricing schedule (e.g., in step 336), data from the ticket pricing template (e.g., in step 338), and the offering price parameters for the ticket (e.g., in steps 340A, 340B, 340C, examples being adjusted pricing ratios, the pricing add-ons, price boundaries and override scenarios). The result is an updated offering price of the ticket, which can be stored in the database(s) 116 of the ticket broker platform 108 in some cases. The updated offering price of the ticket is communicated (e.g., via an API call) to the POS system 110, which subsequently communicates ticket pricing instructions to the secondary market ticket exchange servers 106 that changes the current offering price of the ticket on the secondary market ticket exchange servers 106 to the updated offering prices determined by the ticket pricing engine 114. This series of steps continues until the ticket is sold or the broker removes the listing from the secondary market ticket exchange servers 106.

FIG. 4 shows an example flowchart 400 that illustrates in further detail how the updated offering price of a ticket is calculated by the ticket pricing engine 114 (e.g., shown in step 334 of FIG. 3B). As discussed above, offering price parameters for the ticket are taken into account when calculating the updated offering price of a ticket. Some of the offering price parameters are depicted in FIG. 4 as current and future price overrides (e.g., in step 402A), price modifiers (e.g., in step 402B), and price restrictions (e.g., in steps 402C, 402D). At step 404, the pricing engine 114 prepares to price the ticket. At step 406, the pricing engine 114 determines whether it is time to calculate an updated offering price for the ticket (e.g., based on data from the ticket pricing schedule). If the time is not included in the times specified by the ticket pricing schedule, the ticket pricing engine 114 does not calculate the updated offering price for the ticket. On the other hand, if the time is included in the times specified by the ticket pricing schedule, the ticket pricing engine 114 determines the target ROI to be achieved from the sale of the ticket (e.g., in step 408). In some implementations, the target ROI may be a default ROI included in the offering price parameters of the ticket. In general, the target ROI may depend on various factors, including the motive of the broker, the market, current events, and so on. In step 410, the ticket price is set to achieve the target ROI specified in step 408.

In step 412, the pricing engine 114 determines whether an adjusted ratio needs to be applied to the ticket price set in step 410, and in step 411 the adjusted ratios are applied. In some implementations, the default ROI can be overwritten (e.g., by the broker), and the adjusted ratio indicates how much the default ROI has been adjusted by the broker. In some implementations, the adjusted ratio has a domino effect that modifies all future price points of the ticket pricing template. In this way, brokers can alter prices forecasted by the ticket pricing template quickly and accurately.

In some implementations, the adjusted ratio may be modified by hyperparameters 413. Hyperparameters can be binary, e.g., "yes" or "no," or a defined range. In some implementations, a binary hyperparameter may represent whether a show is sold out. In another implementation, such a hyperparameter may be described as a percentage, as in 90% sold out. Hyperparameters may be defined by a broker and may be toggled as active or inactive at a broker's discretion on an event-by-event basis. Examples of hyperparameters include, e.g.: an event is sold out; a given section is sold out; a score assigned for a venue; a score assigned for a location; a score assigned for a performer; a type of event, such as a sporting event, concert, festival, comedy, or theatrical performance; further decomposition of a type of event, e.g., a genre. An example of a decomposition can be a type of concert, e.g., rock, pop, or country. Hyperparameters can also be either static or dynamic. Static hyperparameters are unaffected by changes in an event. For example, a static hyperparameter can be a type of event. Dynamic hyperparameters can be influenced by live data. An example of a dynamic hyperparameter is whether an event is sold out.

Other examples of hyperparameters can include: if the event is scheduled on a holiday; the day of the week; a weather status; allowance of odd or even numbers of tickets; allowance of single tickets; general admission tickets; a measurement of the number of sales in a period of time; or a sale related to the market or exclusive to the broker's own inventory. Hyperparameters can be further defined as to whether they impact the price to make it premium or discounted (e.g., at step 415). In an example, if a hyperparameter "Day of the Week" is active and a concert is on a Thursday, this may discount the event since Friday and Saturday tend to be more popular for concerts. In another example, if a football game is scheduled for a Thursday, the event may be made premium with a national audience.

Figure 5A:
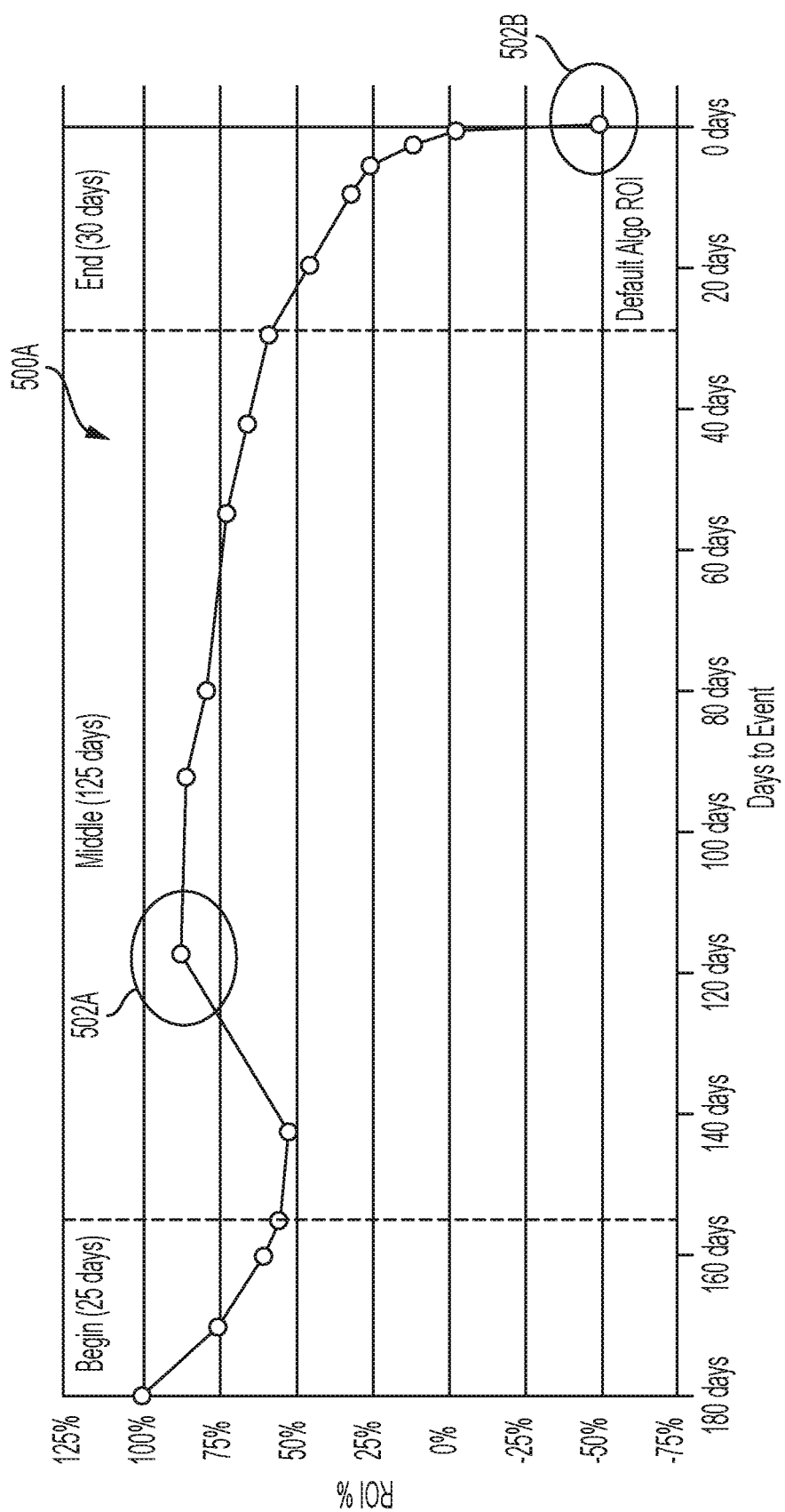
FIGS. 5A to 5C show examples of how the shape and endpoints of a ticket pricing template may be varied based on a user-defined override.

As an example, suppose the ticket price is set to $100 in step 410, but the broker believes that that $100 is too high and that the ticket price should actually be $75. In such a scenario, the broker can input $75 as a manual price override. Both the $100 price and the manual $75 price for the particular time point are taken as inputs by the pricing engine 114, which then calculates an adjusted ratio that adjust future price points of the ticket pricing template to be in line with the 25% decrease in price. One example of how the adjusted ratio changes the future price points of the ticket pricing template is shown in FIG. 5A. Specifically, FIG. 5A shows how the ticket pricing template 200B shown in FIG. 2B is changed to a new ticket pricing template 500A when an adjusted ratio is calculated from a present time point (shown in FIG. 5A as time point 502A). As seen in the example of FIG. 5A, the final price point of the new ticket pricing template 500A (e.g., target ROI at the endpoint 502B) is the same as the final price point (e.g., target ROI) of the ticket pricing template 200B; however, the price points (e.g., target ROI) at time points between time point 502A and endpoint 502B are scaled in relation to the adjusted ratio. Therefore, applying an adjusted ratio takes the new override point (e.g., at time point 502A in FIG. 5A), holds constant the final price point of the ticket pricing template at endpoint 502B, and stretches or shrinks the shape of the ticket pricing template between time point 502A and endpoint 502B along the vertical axis.

In step 414, the pricing engine 114 determines whether a pricing modifier needs to be applied to the ticket price calculated as a result of step 412. In some implementations, the pricing modifier includes predetermined pricing premiums or predetermined pricing discounts to be applied to the offering price of the ticket. In step 416, the ticket price calculated because of step 414 is checked to ensure that it satisfies the minimum price of the ticket (which may be specified by the offering price parameters for the ticket). In an implementation, a hyperparameter may be incorporated in a pricing modifier.

In step 418, the pricing engine 114 determines whether further manual overrides (e.g., by the broker) to the updated offering price of the ticket are needed. If no further overrides are needed, the ticket price calculated at step 416 is taken as the updated offering price of the ticket. However, if further overrides are needed, the pricing engine 114 determines (e.g., in step 420), how the pricing override affects other points in the ticket pricing template.

Figure 5B:
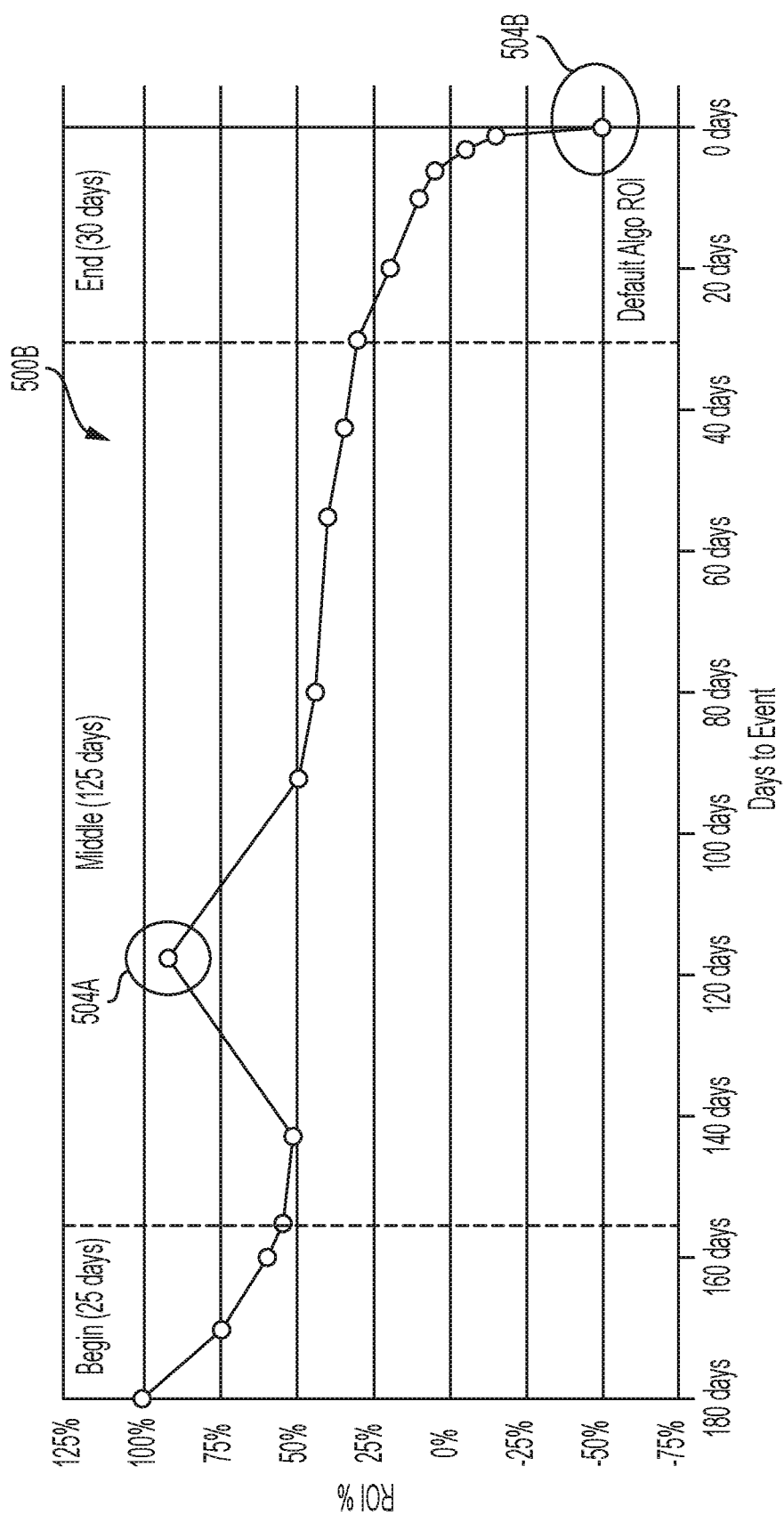

In some implementations, a further manual override by the broker is a simple point change and applies only to the offering price of the ticket at that point in time, with all other points in the ticket pricing template being unaffected. For example, FIG. 5B shows how a simple point change to the ticket pricing template 200B shown in FIG. 2B at time point 504A changes the ticket pricing template 200B shown in FIG. 2B to a new ticket pricing template 500B. As seen in the example of FIG. 5B, the price at time point 504A is changed, but all other points in the ticket pricing template (including the final price point at the endpoint 504B) are unaffected. Therefore, if the pricing engine 114 determines that the further manual override is a simple point change, the step 422 uses that manually set point as the updated offering price of the ticket (e.g., in step 426), while holding constant all other price points (including the final price point) of the ticket pricing template.

Figure 5C:
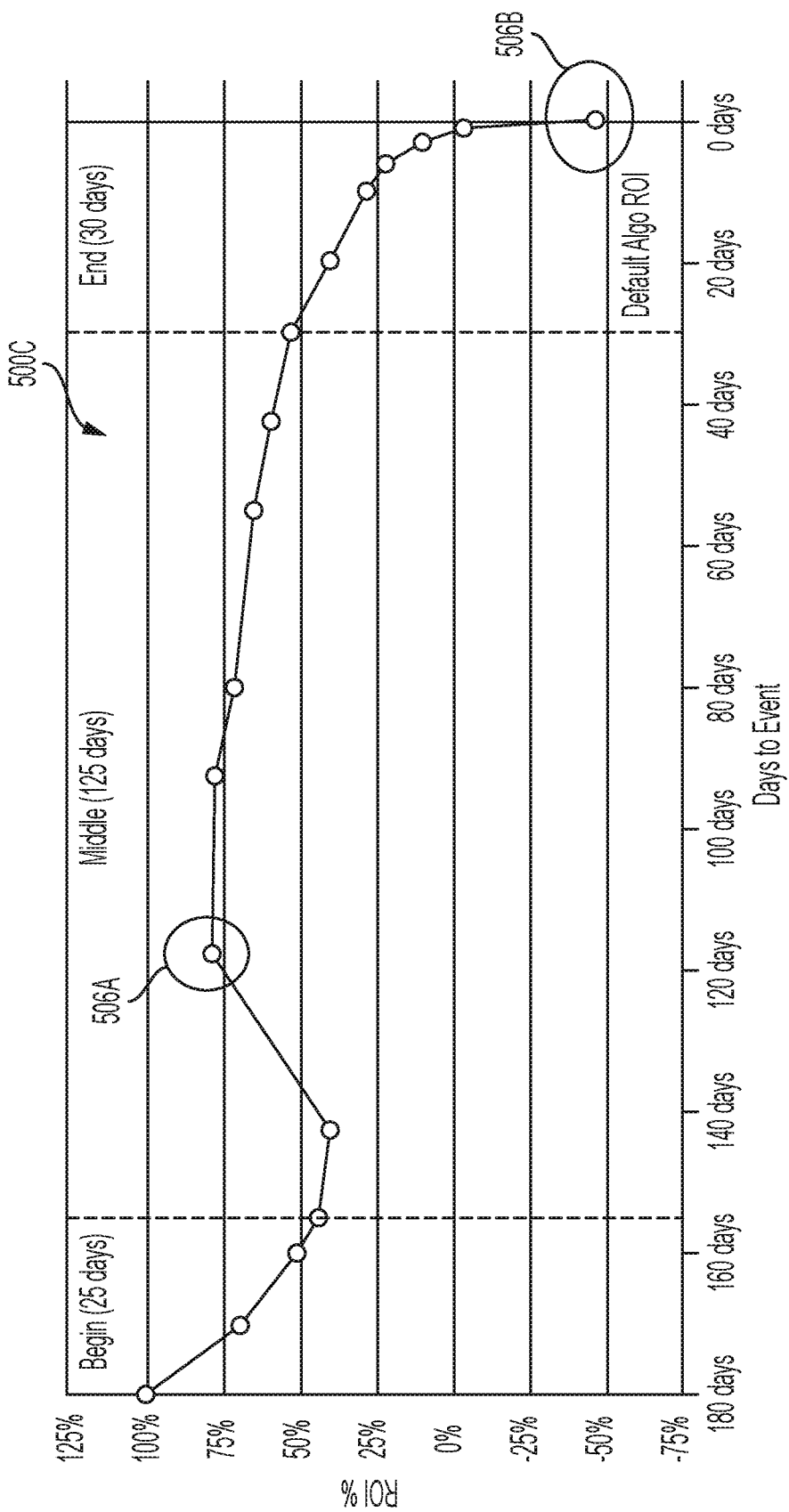

In some implementations, a further manual override by the broker results in further changes to future price points of the ticket pricing template. For example, FIG. 5C shows how a change to the ticket pricing template 200B shown in FIG. 2B at time point 506A changes the ticket pricing template 200B shown in FIG. 2B to a new ticket pricing template 500C. In contrast to the pricing template 500A in FIG. 5A (whose shape is stretched or shrunk along the vertical axis relative to ticket pricing template 200B) and pricing template 500B in FIG. 5A (where only the price point at time point 504A is changed), the ticket pricing template 500C is formed by trending the price points between two manually set prices in a manner that maintains the shape of the ticket pricing template 200B from time point 506A onwards, which includes changing the price point at endpoint 506B in order to maintain the shape of the ticket pricing template 200B from time point 506A to endpoint 506B. Therefore, if the pricing engine 114 determines that the further manual override shifts future price points of the ticket pricing template, the step 424 uses that manually set point at time point 506 as the updated offering price of the ticket (e.g., in step 426), and also uses the future price points of the ticket pricing template for subsequent adjustments of the offering price of the ticket. Therefore, based on the description of the flowchart 400, manually overriding a price can affect future price points of the ticket pricing template in a number of ways: (1) when an adjusted ratio is calculated (e.g., in step 412), the shape of the ticket pricing template is changed relative to the manually set price; (2) the price points are trended between two manually set prices in a manner that maintains the shape of the ticket pricing template (e.g. in step 424); and (3) a simple point change that does not affect other points in the ticket pricing template.

Figure 6:
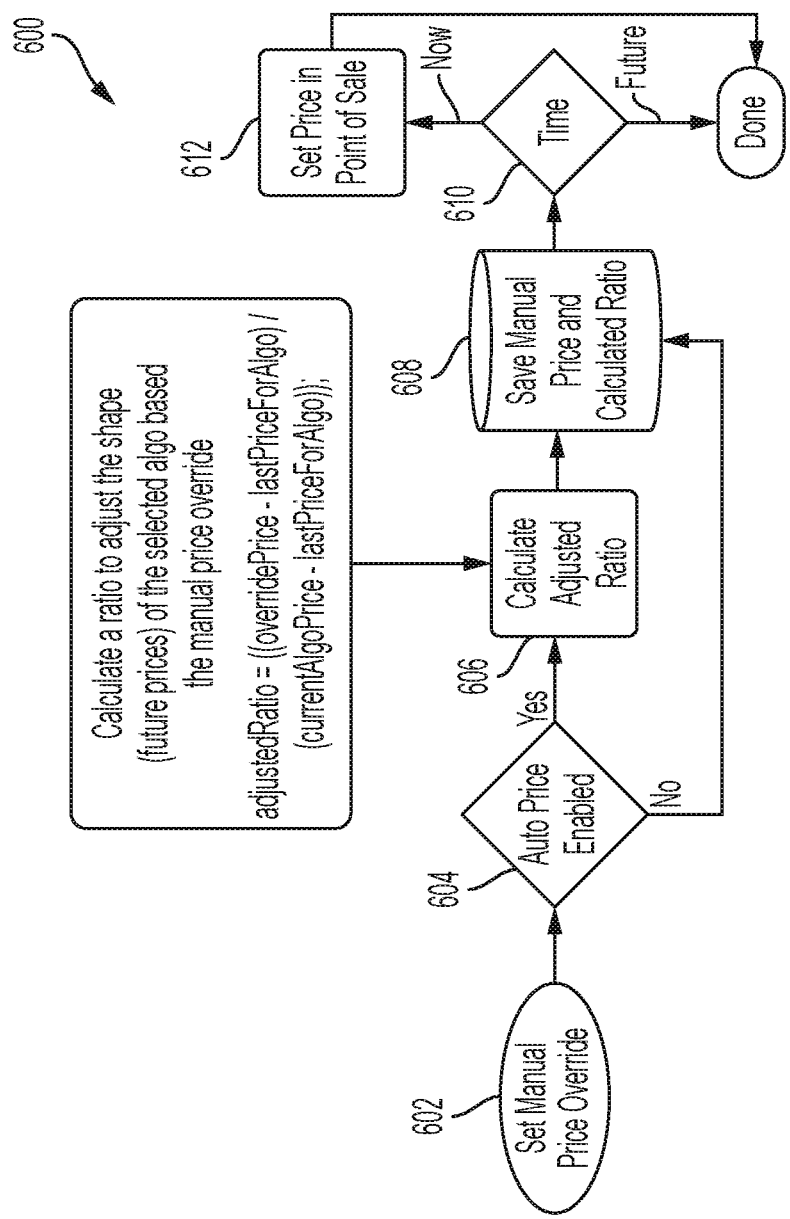
FIG. 6 shows an example flowchart that illustrates how an override is applied to a ticket pricing template.

FIG. 6 shows an example flowchart 600 that illustrates how an override is applied to a ticket pricing template. In step 602, the pricing engine 114 determines that a manual price override is needed. In step 604, the pricing engine 114 determines whether automatic pricing is enabled. If automatic pricing is enabled, step 606 is executed, where an adjusted ratio is calculated (e.g., as discussed above in FIG. 5A) in order to adjust the price. The manual price and calculated ratio are subsequently saved (e.g., in step 608) and implemented over time. In examples where automatic pricing is not enabled, calculation of the adjusted ratio is skipped, and step 608 is executed. At step 610, the ticket price is set in the POS system 110 when it is time to calculate or set an updated offering price for the ticket (e.g., in steps 610 and 612).

Figure 7:
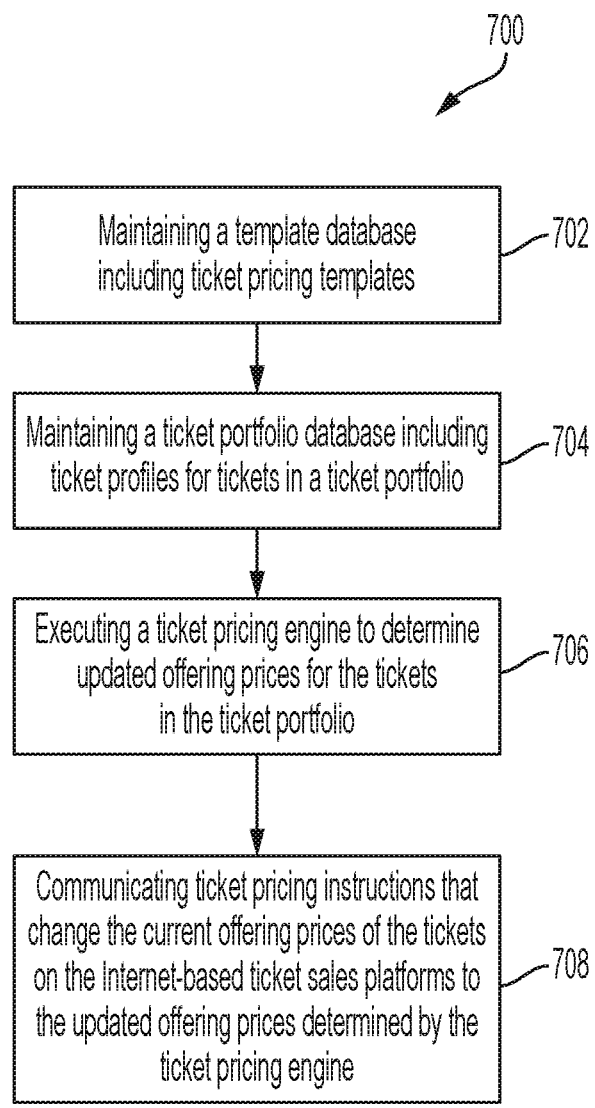
FIG. 7 shows an example method that improves the efficiency of a computer-implemented, cloud-based ticket broker platform.

FIG. 7 shows an example method 700 that improves the efficiency of a computer-implemented, cloud-based ticket broker platform. The method 700 include step 702 of maintaining a template database including ticket pricing templates. As discussed above, the ticket pricing templates may be maintained on the cloud-based ticket broker platform and each ticket pricing template specifies a time-series of adjustments for ticket price offerings. The method 700 includes step 704 of maintaining a ticket portfolio database including ticket profiles for tickets in a ticket portfolio. As discussed above, the ticket portfolio database may be maintained on the cloud-based ticket broker platform. In some implementations, the ticket profile for each ticket specifies a current offering price on Internet-based ticket sales platforms, ticket attributes, offering price parameters, and one of the ticket pricing templates.

The method 700 includes step 706 of executing a ticket pricing engine to determine updated offering prices for the tickets in the ticket portfolio. As discussed above, the ticket pricing engine is executed on the cloud-based ticket broker platform. Furthermore, as discussed above, the ticket pricing engine determines the updated offering price of a ticket by: identifying the current offering price of the ticket; identifying the offering price parameters of the ticket; identifying the ticket pricing template associated with the ticket; and calculating the updated offering price based on the current offering price for the ticket, the ticket pricing template for the ticket, and the offering price parameters for the ticket.

The method 700 includes step 708 of communicating ticket pricing instructions that change the current offering prices of the tickets on the Internet-based ticket sales platforms (e.g., secondary ticket market seller servers 106) to the updated offering prices determined by the ticket pricing engine. As discussed above, the ticket pricing instructions are communicated from the cloud-based ticket broker platform to application programming interfaces (APIs) of the respective Internet-based ticket sales platforms.

The method 700 provides several technical improvements and advantages over existing approaches. For example, the method 700 reduces manual interventions, precisely schedules changes to ticket prices, and allows for the seamless management of higher ticket volumes. For example, the method 700 manages large amounts of data related to the sale of event tickets, provides for seamless and precisely-timed communications with disparate computer systems, and precisely times the prices of the tickets to a changing market so that the tickets remain competitively priced.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

In some aspects, a method is provided of maintaining, on a cloud-based control platform, a database comprising a plurality of data objects for a plurality of remotely-controlled assets. The data objects for each remotely-controlled asset include: a plurality of static hyperparameters associated with the asset, a plurality of dynamic hyperparameters associated with the asset, and a template that specifies values of a variable associated with the asset for a plurality of future time points. The method further includes, by operation of the cloud-based control platform, determining an updated template for one of the data objects. Determination of the updated template involves calculating target values for the variable for the plurality of future time points based on a target criterion, communicating with one or more remote computer systems to determine current values of the dynamic hyperparameters, and determining a ratio based on the current values of the dynamic hyperparameters. Determination of the updated template further involves calculating scaled values for the plurality of future time points by applying the ratio to the target values, determining an adjustment based on the static hyperparameters, and calculating first modified values for the plurality of future time points by applying the adjustment to the scaled values. Determination of the updated template also involves calculating second modified values for the plurality of future time points by applying an override value to the first modified values and assigning the second modified values to the template. The method additionally includes, by operation of the cloud-based control platform, iteratively updating a remotely-controlled system according to the updated template at each of the plurality of future time points. Updating the remotely-controlled system includes identifying a next value of the variable, wherein the next value of the variable is the value specified by the updated template for a time point associated with a current time, and communicating the next value to the remotely-controlled system with instructions to assign the next value of the variable to a setting associated with the remotely-controlled asset.

In a first example, a method of improving efficiency of a computer-implemented, cloud-based ticket broker platform includes: maintaining, on the cloud-based ticket broker platform, a template database including ticket pricing templates, each ticket pricing template specifying a time-series of adjustments for ticket price offerings. The method further includes maintaining, on the cloud-based ticket broker platform, a ticket portfolio database including ticket profiles for tickets in a ticket portfolio. The ticket profile for each ticket specifies: a current offering price on Internet-based ticket sales platforms, ticket attributes, offering price parameters, and one of the ticket pricing templates. The method additionally includes executing, on the cloud-based ticket broker platform, a ticket pricing engine to determine updated offering prices for the tickets in the ticket portfolio, where the ticket pricing engine determines the updated offering price of a ticket by: identifying the current offering price of the ticket; identifying the offering price parameters of the ticket; identifying the ticket pricing template associated with the ticket; and calculating the updated offering price based on the current offering price for the ticket, the ticket pricing template for the ticket, and the offering price parameters for the ticket. The method also includes communicating, from the cloud-based ticket broker platform to application programming interfaces (APIs) of the respective Internet-based ticket sales platforms, ticket pricing instructions that change the current offering prices of the tickets on the Internet-based ticket sales platforms to the updated offering prices determined by the ticket pricing engine.

Implementations of the first example may include one or more of the following features. The method of the first example, in which the ticket profile for each ticket further specifies times to calculate the updated offering price for the ticket, and executing the ticket pricing engine comprises determining the updated offering price for the ticket at the times specified in the ticket profile for the ticket. In some implementations, the times specified in the ticket profile for the ticket are not equally spaced apart. The method of the first example, in which the offering price parameters comprise a target profit to be achieved from sales of the tickets, and calculating the updated offering price comprises setting the updated offering price for the ticket to achieve the target profit (which may be a dollar profit after all adjustments and calculations). The method of the first example, where the offering price parameters comprise predetermined pricing premiums or predetermined pricing discounts to be applied to the offering prices of the tickets, and calculating the updated offering price includes: calculating an interim offering price for the ticket based on the current offering price for the ticket and the ticket pricing template for the ticket; and applying the predetermined pricing premiums or the predetermined pricing discounts to the interim offering price to generate the updated offering price for the ticket. The method of the first example, in which the offering price parameters include minimum prices for the tickets, and calculating the updated offering price includes setting the updated offering price to be greater than the minimum price for the ticket. The method of the first example, in which the offering price parameters include pricing overrides applied by a ticket broker to the ticket price offerings, and calculating the updated offering price includes: calculating an interim offering price for the ticket based on the current offering price for the ticket and the ticket pricing template for the ticket; and applying the pricing overrides to the interim offering price to generate the updated offering price for the ticket. In some implementations, future time points in the ticket pricing template are varied based on the pricing overrides. In some implementations, future time points in the ticket pricing template are left unchanged.

A non-transitory computer-readable medium may store instructions that are operable when executed by data processing apparatus to perform one or more operations described above. A computer system may include one or more processors and memory storing instructions that are configured, when executed by the one or more processors, to perform one or more operations described above.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
    maintaining, on a cloud-based control platform, a database comprising a plurality of data objects for a plurality of remotely-controlled assets, the data objects for each remotely-controlled asset comprising:
        a plurality of static hyperparameters associated with the asset;
        a plurality of dynamic hyperparameters associated with the asset; and
        a template that specifies values of a variable associated with the asset for a plurality of future time points;
    by operation of the cloud-based control platform, determining updated templates for the data objects, wherein each updated template is determined by:
        calculating target values for the variable for the plurality of future time points based on a target criterion;
        communicating with one or more remote computer systems to determine current values of the dynamic hyperparameters;
        determining a ratio based on the current values of the dynamic hyperparameters;
        calculating scaled values for the plurality of future time points by multiplying the ratio with the target values;
        determining an adjustment based on the static hyperparameters;
        calculating first modified values for the plurality of future time points by applying the adjustment to the scaled values;
        calculating second modified values for the plurality of future time points by applying an override value to the first modified values; and
        assigning the second modified values to the template; and
    by operation of the cloud-based control platform, performing centralized, coordinated control over the plurality of remotely-controlled assets, wherein the centralized, coordinated control over the plurality of remotely-controlled assets is performed by iteratively instructing remotely-controlled systems according to the updated templates at each of the plurality of future time points, wherein instructing the remotely-controlled systems comprises:
        identifying next values of the variables, wherein the next values of the variables are the values specified by the updated templates for a time point associated with a current time; and
        communicating the next values to the remotely-controlled systems with instructions to assign the next values of the variables to respective settings associated with the remotely-controlled assets.

2. The method of claim 1, wherein the cloud-based control platform communicates with the one or more remote computer systems and the remotely-controlled system over the Internet.

3. The method of claim 1, comprising, prior to determining the updated template, selecting the template based on the variable associated with the asset.

4. The method of claim 1, wherein the data objects are formatted to be interpreted by an application or virtual machine running on one or more nodes of the cloud-based control platform.

* * * * *

UNITED STATES PATENT AND TRADEMARK OFFICE
CERTIFICATE OF CORRECTION

| | | |
|---|---|---|
| PATENT NO. | : 11,853,923 B2 | Page 1 of 1 |
| APPLICATION NO. | : 17/511273 | |
| DATED | : December 26, 2023 | |
| INVENTOR(S) | : Crutcher et al. | |

It is certified that error appears in the above-identified patent and that said Letters Patent is hereby corrected as shown below:

On the Title Page

Insert inventor --Scott Michael Brandt, Dallas, TX (US)--

Signed and Sealed this
Twenty-seventh Day of May, 2025

Coke Morgan Stewart
*Acting Director of the United States Patent and Trademark Office*